US009916733B2

(12) United States Patent
Berman et al.

(10) Patent No.: US 9,916,733 B2
(45) Date of Patent: Mar. 13, 2018

(54) GAMING DEVICE HAVING MUTABLE AWARDS

(71) Applicant: KING SHOW GAMES, INC., Minnetonka, MN (US)

(72) Inventors: Bradley Berman, Minnetonka, MN (US); Peter Berman, Minneapolis, MN (US); Jacob Lamb, Maple Grove, MN (US)

( * ) Notice: Subject to any disclaimer, the term of this patent is extended or adjusted under 35 U.S.C. 154(b) by 360 days.

(21) Appl. No.: 14/575,812

(22) Filed: Dec. 18, 2014

(65) Prior Publication Data

US 2015/0206383 A1 Jul. 23, 2015

Related U.S. Application Data

(60) Provisional application No. 61/928,475, filed on Jan. 17, 2014, provisional application No. 61/932,351, filed on Jan. 28, 2014.

(51) Int. Cl.
*A63F 13/00* (2014.01)
*G07F 17/34* (2006.01)
*G07F 17/32* (2006.01)

(52) U.S. Cl.
CPC .......... *G07F 17/34* (2013.01); *G07F 17/3267* (2013.01); *G07F 17/3269* (2013.01)

(58) Field of Classification Search
CPC ............... G07F 17/323; G07F 17/3244; G07F 17/3258; G07F 17/3267
USPC ........................................................ 463/20, 25
See application file for complete search history.

(56) References Cited

U.S. PATENT DOCUMENTS

2011/0053680 A1* 3/2011 Acres ...................... G07F 17/32 463/25
2012/0196666 A1* 8/2012 Moody ................... G07F 17/32 463/13
2014/0024437 A1* 1/2014 Vann .................. G07F 17/3279 463/25
2014/0179396 A1* 6/2014 Aoki .................. G07F 17/3267 463/20
2015/0072766 A1* 3/2015 Hughes ............... G07F 17/3244 463/25

* cited by examiner

*Primary Examiner* — James S McClellan

(57) ABSTRACT

Embodiments of the present invention set forth systems, apparatuses and methods for providing mutable awards in gaming devices. Accordingly, a gaming device can be configured to include processes where various properties, functions, characteristics, displays, or other award components have some dynamic variability between game play events on a gaming system or within a gaming device. Although not all, or even one, of the award components needs to be changed or mutated between game play events, the processes are configured to allow such award components to be changed or mutated within a predefined time frame, within a defined game event, or within another measurable criterion.

20 Claims, 20 Drawing Sheets

GAMING DEVICE HAVING MUTABLE AWARDS

RELATED APPLICATIONS

This application claims the benefit of Provisional Patent Application No. 61/928,475, filed on Jan. 17, 2014 and Provisional Patent Application No. 61/932,351, filed on Jan. 28, 2014, both of to which priority is claimed pursuant to 35 U.S.C. § 119(e) and both of which are incorporated herein by reference in their entirety.

FIELD OF THE INVENTION

This disclosure relates generally to games, and more particularly to systems, apparatuses and methods for providing mutable awards in gaming devices.

BACKGROUND

Casino games such as poker, slots, and craps have long been enjoyed as a means of entertainment. Almost any game of chance that can be played using traditional apparatus (e.g., cards, dice) can be simulated on a computer. The popularity of casino gambling with wagering continues to increase, as does recreational gambling such as non-wagering computer game gambling. It is also likely that most new games will be implemented, at least in part, using computerized apparatus.

One reason that casino games are widely implemented on computerized apparatus is that computerized games are highly adaptable, easily configurable and re-configurable, and require minimal supervision to operate. For example, the graphics and sounds included in such games can be easily modified to reflect popular subjects, such as movies and television shows.

Computer gaming devices can also be easily adapted to provide entirely new games of chance that might be difficult to implement using mechanical or discrete electronic circuits. Because of the ubiquity of computerized gaming machines, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill. In some jurisdictions, the absence of skill when determining awards during game play is a requirement.

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise facilitate implementation of mutable awards on gaming devices. Here, a gaming device can be configured to include processes where various properties, functions, characteristics, displays, or other award components have some dynamic variability between game play events on a gaming system or within a gaming device. Although not all, or even one, of the award components needs to be changed or mutated between game play events, the processes are configured to allow such award components to be changed or mutated within a predefined time frame, within a defined game event, or within another measurable criterion.

DETAILED DESCRIPTION

Figure 1:
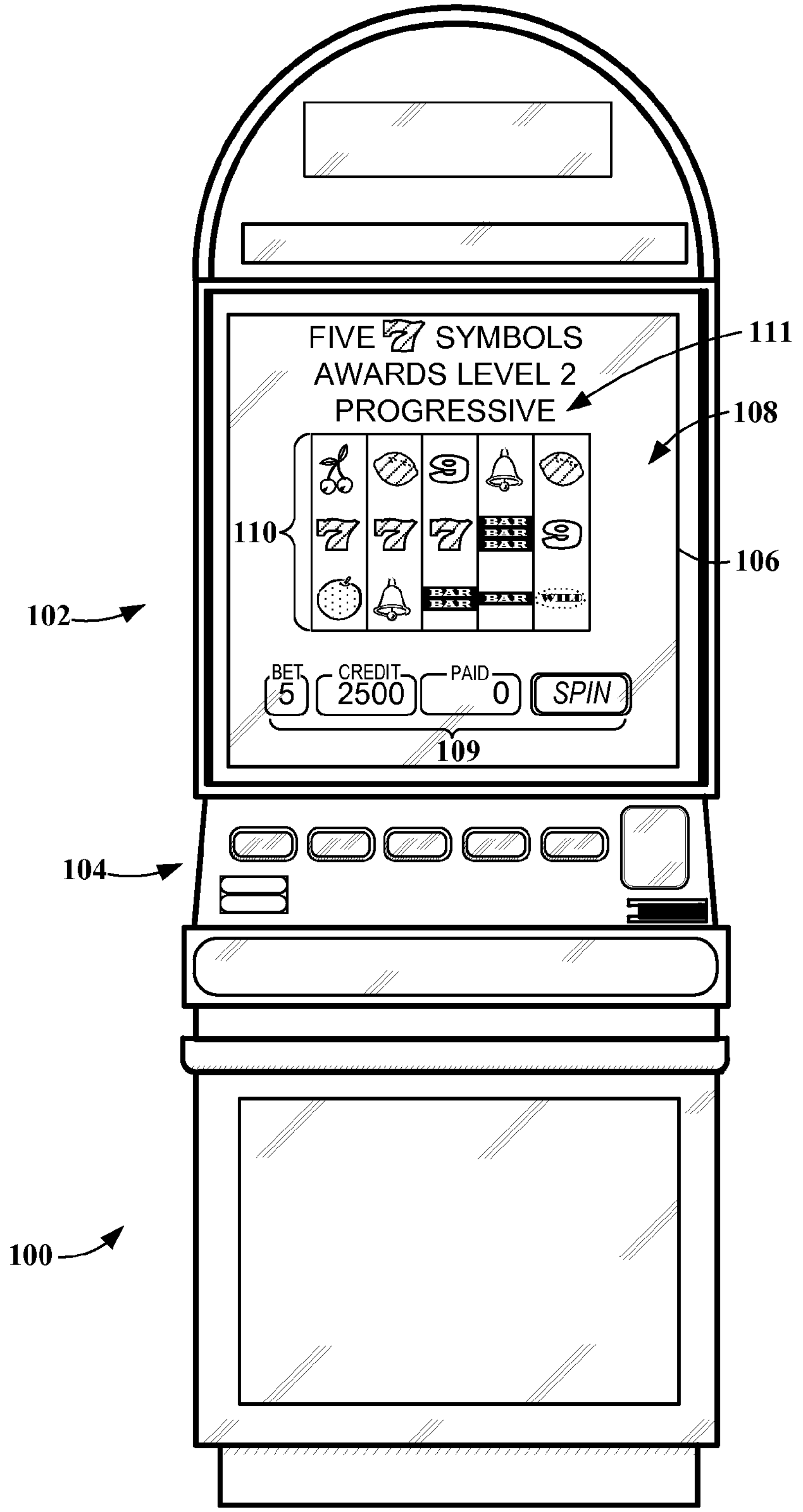
FIG. 1 is a diagram of an example gaming machine according to embodiments of the invention.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the term "reels," "cards," "decks," and similar mechanically descriptive language may be used to describe various apparatus presentation features, as well as various actions occurring to those objects (e.g., "spin," "draw," "hold," "bet"). Although the present disclosure may be applicable to both to manual, mechanical, and computerized embodiments, and any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms “cards,” “decks,” “reels,” “hands,” etc., are intended to describe both physical objects and emulation or simulations of those objects and their behaviors using electronic apparatus.

In various embodiments of the invention, the gaming displays are described in conjunction with the use of data in the form of “symbols.” In the context of this disclosure, a “symbol” may generally refer at least to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are described for enhancing winning result opportunities in gaming activities. In some embodiments, this enhancement includes providing mutable awards that can dynamically change various award processes or features between game play events. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. video slot machine) are provided for purposes of facilitating an understanding of the features described herein. However, the principles described herein are equally applicable to any game of chance where an outcome(s) is determined for use in the player's gaming activity. The game features described herein may be employed in stand-alone games, a primary/base games, bonus games, side bet games, etc.

Returning to some of the particular embodiments in this disclosure, gaming devices are configured to provide mutable awards. Here, these embodiments include processes where various properties, functions, characteristics, displays, or other award components have some dynamic variability between game play events on a gaming system or within a gaming device. Although not all, or even one, of the award components needs to be changed or mutated between game play events, the processes are configured to allow such award components to be changed or mutated within a predefined time frame, within a defined game event, or within another measurable criterion.

Some embodiments provided herein describe a method to create an award or feature in a video slot game with at least some of the following properties regarding award processes or rules: 1) Rules defining the award or feature are capable of changing from one bet to the next; 2) Rule changes occur and are communicated to the player before it is determined whether to initiate the award or feature; and/or 3) The rule changes are large in magnitude and/or applicable to multiple aspects of the award or feature.

Properties or components of an award or feature can include, but are not limited to:

- Category (e.g., fixed-credit award; progressive award; free-games bonus or other feature)
- Initiation requirements (e.g., identity of initiating symbol or symbols; number of symbols required; location of symbols)
- Degree of magnitude (e.g., credit award amount; Progressive award level; number of free games awarded; multiplier value, etc.)

While some conventional games allow for minor changes in at most one of these aspects, such as progressive awards that add a portion of a coin wager to a progressive award amount, some embodiments of the present concept allow two or more aspects to vary, thus providing increased variety to players. Other embodiments enable games to randomly carry out a temporary, substantial change to the rules for a given feature or award. In some embodiments, rules changes under the present concept are made visible to a player as they happen, and may be made visible before it is known whether the award will be won or the feature initiated. Such visibility may not only promote variety of experience for the player, but may also provide a unique sense of anticipation for the player.

Possible Embodiments and Variations

Items 1, 2(a), and 2(b) below extend the traditional Progressive game mechanic, providing new ways to allocate a proportion of every credit bet to increasing the expected pay of a given award. Item 2(c) is a multiplayer feature, while Item 3 is a standalone game mechanic. Item 4 describes some variants. While a Progressive award is described below as the mutable award, these principles can be applied to any type of mutable award.

1. Multi-dimensional, large changes with small net impact.
   a. A progressive award in which two or more aspects may change simultaneously, e.g.: the rule may change from
      4 [P1] on Line 90 or higher awards 20,150 credits to
      3 [P1] on Line 100 awards 20,151 credits.
   b. A progressive award in which new, alternative initiation conditions are added, e.g.: the rule may change from
      4 [P1] on any line awards 20,150 credits to
      Either 4 [P1] on any line or 3 [P1] on Line 100 awards 20,151 credits.
2. Single-dimensional or multi-dimensional; large, temporary changes occur at random. A progressive award in which one or more aspects may change at random for a specified duration. Examples:
   a. Initially, the progressive awards 100 credits. On any given bet, after the bet is placed, a random draw is performed, and with some probability the award is increased to 1000 credits. (This change may apply only to the current bet.) The probability of this change occurring increases with each bet. Once the probability reaches 100%, the default award becomes 1000 credits, and there is a random draw to decide whether to award 10,000 credits.
   b. Initially, the progressive is initiated by 5 SC symbols. With each bet, a random draw is performed, and with some probability the initiation requirement is changed from “5 SC” to “4 or more SC” (for the present bet only). This probability increases gradually with each bet. If the probability reaches 100%, then “4 or more SC” becomes the default requirement, and there is some probability that the requirement will change to “3 or more SC.”

c. A “frenzy mode” feature. This feature may be defined so that it applies to a single machine, or it may be defined so that it applies to all eligible machines in a larger group or network. When this feature is initiated, it increases the expected value of the Progressive for a specified period of time or number of bets. The increase could take one of several possible forms, e.g.:
   i. Increment or multiply the jackpot by a certain amount
   ii. Change the Progressive initiation criteria from “5 SC symbols” to “3 or more SC symbols”
   iii. In a game with multiple Progressive levels, change the awards from (say) “3 SC awards Level 1, 4 SC awards Level 2, . . . ” to “3 SC awards Level 2, 4 SC awards Level 3, . . . ”.

3. Multi-dimensional, large changes, high volatility. An award with multiple aspects that vary from one bet to the next, based on one or more templates. Frequently, one or two aspects (but no more) are favorable to the player. For example, if the rule template is
   [symbol] [symbol] [symbol] on central payline awards <amount>, then the rule itself may change from
   [Red 7] [Any 7] [Triple Bar] on central payline awards 100 to
   [Any Bar] [Blue 7] [Single Bar] on central payline awards 20 to
   [Double Bar] [Any Bar] [Any 7] on central payline awards 200. The condition with maximum possible expected value may look something like:
   [Any Bar] [Any Bar] [Any Bar] on central payline awards 10,000 and would naturally be extremely unlikely to appear.

4. Variants.
   a. The dimensions or aspects may be: initiation requirements (e.g., initiating symbol or symbols; number of symbols required; location of symbols); Type of award or feature (e.g., fixed-credit award; Progressive award; Free-games bonus or other feature); Magnitude of the award or feature (e.g., credit award amount; Progressive award level; Number of free games awarded; or Multiplier value).
   b. A rules change may affect any number of dimensions of a rule. One embodiment may specify that only one dimension changes per bet; another may specify that all dimensions may change per bet.
   c. Rules changes may be initiated by hidden random draw or by specified symbol combinations or by player action (e.g. pick bonus or wheel spin), or by some combination of these factors.
   d. A rule template may have a blank that is filled by another rule template, so that (e.g.)
      “3 [SC] initiates Progressive Level 5” may change to
      “3 [SC] initiates Free Spin Bonus with Multiplier 10×.”
   e. A game may have more than one feature governed by mutable rules, and/or a game may have feature(s) governed by more than one mutable rule.
   f. Rules changes may be triggered or otherwise affected by a central controller rather that by an individual machine.

Rule Templates

In a typical embodiment of the present invention, one or more templates may be used to define an award or feature with mutable properties. For each template, initial values and rules for changing the values are defined. The rest of this section contains an example of how this may work in practice.

For example, the embodiment shown in FIGS. 2A-2D uses a rule template to help define a composition of a mutable award.

Consider the following template:

Count of symbol name from left to right on line line-descriptor awards Progressive level progressive level number.

The blanks in this template may be initially filled in so that the initiation criterion is as follows:

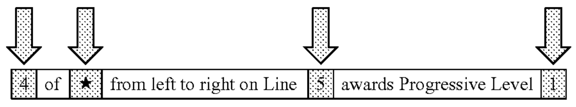

Here, the spaces indicated with arrows above them are the variable fields of the template which can be filled with one or more of multiple predefined values or objects. These blanks can be filled using various routines or techniques. As an example, refer again to FIGS. 2A-2D below in which a game display is shown following a gaming event (see FIG. 2A below). The items that fill in the blanks are changed while the reels are still spinning (FIGS. 2B and 2C), and then the new rule applies after the reels stop spinning (FIG. 2D).

Standalone Game with Multidimensional Progressive (Note: Specific numbers listed below are for illustration only; they do not represent rigorous mathematics.)

A 100-line, 5-reel game in which 0.8% of each credit bet is allocated both to incrementing the Progressive award meter and to making it easier to win the Progressive. After the Progressive is reset, the rule for awarding the Progressive is
   5 [P1] on Line 100 awards 10,000 credits.

After a certain number of bets, this condition may change to
   5 [P1] on Line 100 awards 10,001 credits.

After a number of additional bets, the condition may change from
   5 [P1] on Line 100 awards 10,027 credits to
   5 [P1] on Line 99 or higher awards 10,027 credits or possibly to
   5 [P1] on Line 99 or higher awards 10,028 credits.

If the Progressive is not won after a large number of additional bets, then the condition may change from
   5 [P1] on Line 1 or higher awards 11,017 credits to
   5 [P1] on any line, or 4 [P1] n Line 100, awards 11,017 credits.

After some more bets, the condition may change from
   5 [P1] n any line, or 4 [P1] n Line 100, awards 11,038 credits. to
   5 [P1] n any line, or 4 [P1] on Line 99 or higher, awards 11,038 credits.

This process continues until the Progressive is won or the “best possible” initiation condition is reached.

Wide-Area Progressive with Frenzy Modes

Although any type of gaming device may be used, consider a 3-reel game with a wide-area progressive in this illustrative example. Under normal circumstances, the rule for awarding the Progressive is 3 scattered [SC] symbols awards the wide-area jackpot.

Each bet has a small probability of initiating a "frenzy mode," in which (for a certain number of subsequent bets) the rule for awarding the Progressive is 2 scattered [SC] symbols awards the wide-area jackpot.

Moreover, a central controller periodically sends a message to all machines in a certain group (either a randomly chosen bank, or a randomly chosen casino, or the entire network), instructing those machines to enter a "super frenzy mode" provided some eligibility condition (e.g., a certain number of qualifying bets placed over the past 120 seconds) is met. During the super frenzy mode, the "2 scattered symbols" rule is in effect for all eligible machines for a certain period of time.

Progressive Award in a Free-Games Bonus; One Element Improves Per Spin

When a free-games bonus is initiated, the Progressive properties (also called herein mutable components of the mutable award) are assigned a default set of values, e.g.: "5 of ♠ from left to right on Line 1 awards Progressive Level 1." With each free game played, one aspect of the Progressive properties is incremented or decremented during the spin, in such a fashion as to improve the expected value of the Progressive for the player. Here is an example of how the Progressive conditions may evolve from one free game to the next, in a bonus consisting of 10 free games, with the changed element underlined on each line.

1. 4 of ♠ from left to right on Line 1 awards Progressive Level 1
2. 4 of ♠ from left to right on Line 2orlower awards Progressive Level 1
3. 4 of ♠ from left to right on Line 2 or lower awards Progressive Level 2
4. 4 of ♠ from left to right on Line 3orlower awards Progressive Level 2
5. 4 of ♠ from left to right on Line 4orlower awards Progressive Level 2
6. 4 of O from left to right on Line 4 or lower awards Progressive Level 2 (assuming O occurs more frequently than ♠)
7. 3 of O from left to right on Line 4 or lower awards Progressive Level 2
8. 3 of O from left to right on Line 5orlower awards Progressive Level 2
9. 3 of O from left to right on Line 5 or lower awards Progressive Level 3
10. 3 of O from left to right on Line 6orlower awards Progressive Level 3

A representative embodiment for a gaming device to implement the embodiments discussed above is shown in FIG. 1. Embodiments of the present concept include providing gaming devices (also referred to as gaming apparatuses or gaming machines), gaming systems, and methods of operating these devices or systems to provide game play that utilizes operations of mutable awards. Although some of these embodiments and variations are discussed above with regard to providing mutable awards, many other embodiments and variations exist that are covered by the principles and scope of this concept. For example, although some of the embodiments discussed above involve reel-based slot machine examples of this concept, other embodiments include applications of mutable award techniques in other types of games such as video poker games, mechanical slot machines, or other games of chance.

Referring to the example gaming apparatus or device 100 shown in FIG. 1, the gaming apparatus includes a display portion 102 (also referred to as a gaming display), and a player interface portion 104, although some or all of the user interface 104 may be provided via the display 102 in touch screen embodiments. The display portion 102 may include one or more display areas 106 that may be included in physically separate displays or as portions of a common large display. Here, the game display 106 includes a game play portion 108 that displays game elements and symbols 110, an award information or messaging portion 111, and an operations portion 109 that can include meters, various game buttons, or other game information for a player of the gaming device 100. This award information or messaging portion 111 may be used in some embodiments to display elements regarding the amounts or characteristics of one or more mutable awards.

The user interface 104 allows the user to control and engage in play of the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are known in the art. For example, coin/symbol input mechanisms, card readers, credit card readers, smart card readers, punch card readers, radio frequency identifier (RFID) readers, and other mechanisms may be used to enter wagers. It is through the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The display device 102 may include one or more of an electronic display, a mechanical display, and a fixed display information, such as paytable information associated with a glass/plastic panel on the gaming machine 100. The symbols or other indicia associated with the play of the game may be presented on an electronic display device or on mechanical devices associated with a mechanical display. Generally, the display 102 devotes the largest portion of viewable area to the primary gaming portion 106. The gaming portion 106 is generally where the visual feedback for any selected game is provided to the user. The gaming portion 106 may render graphical objects such as cards, slot reels, dice, animated characters, and any other gaming visual known in the art. The gaming portion 106 also typically informs players of the outcome of any particular event, including whether the event resulted in a win or loss.

The gaming portion 106 may include other features known in the art that facilitate gaming, such as status and control portion 109. As is generally known in the art, this portion 109 provides information about current bets, current wins, remaining credits, etc. associated with gaming activities of the grid 108. The control portion 109 may also provide touchscreen controls for facilitating game play. The grid 108 may also include touchscreen features, such as facilitating selection of individual cards for holding prior to draw of new cards and/or advancing particular cards to move up to the next hand if conditions are satisfied. The gaming portion 106 of the display 102 may include other features that are not shown, such as paytables, navigation controls, etc.

As discussed above, the gaming portion 106 may also include an award information portion or messaging portion 111 to display elements regarding the amounts or characteristics of one or more mutable awards. For example, in the messaging portion 111 shown in FIG. 1, a specific award initiation requirement (five shaded-7 symbols), and an award magnitude (Progressive Level 2) are shown. The messaging portion 111 may dynamically mutate or change so that different award initiation requirements, different award magnitudes, or other different award components may be shown to a player prior to an outcome of a gaming event being displayed. The dynamic nature of this award information in the messaging portion 111 may provide game enhancement and anticipation for players.

FIGS. 2A-2D, 3A-3D, 4A-4D, 5A-5L, and 6A-6H are detail diagrams of game displays illustrating various game progressions of example gaming devices having mutable awards according to embodiments of the invention. While these figures illustrate some of the possible embodiments utilizing mutable awards concepts, many other embodiments are possible using these and other techniques in implementing mutable awards in gaming devices or gaming systems.

Referring to FIGS. 2A-2D, a gaming display 200 includes a status and command portion 205, a game play grid 210, and a messaging portion 250. The status and command portion 205 may include various meters or displays, such as a Total Bet meter 206 and a Paid Meter 207, as well as interactive buttons or other controls, such as a Spin button 208. The game play grid 210 in this embodiment shows portions of five game reels used in a video slot game. In other embodiments, however, the game grid 210 may include mechanical reels, video poker hands, or other display elements to show gaming events on the display 200. The messaging portion 250 can communicate various data or information to a player at the gaming device. In these embodiments, messaging portion 250 displays information regarding mutable awards associated with gaming events on the game display 200. However, the messaging portion 250 may also be used to show a title or theme of the game, show advertisements, show game stats or information, communicate game play options or pays, or display any other type of information or data.

In the embodiment shown in FIGS. 2A-2D, the messaging portion 250 displays information about an award having multiple mutable components. In particular, the award defines trigger conditions needed to win one of multiple progressive awards. Here, the progressive awards may be won by other predefined conditions, such as predefined symbol combinations specified by a paytable, a mystery award technique, or other predefined award trigger. The mutable award specified in the messaging portion 250 may define an additional way to win one or more of the progressive awards. However, unlike the predefined progressive award triggers, the mutable award components vary or mutate over the course of game play. These mutable qualities may change every game, at specified time intervals, randomly, or based on one or more conditions occurring on the gaming device, such as receiving a win, not receiving a win for "n" number of games, or other conditions. The individual components of the mutable award may change together or may change independently of each other. For example, one component of the award may change during a gaming event while another component keeps its current state. In other embodiments, the mutable award may be the only way to win particular types of awards, such as progressive awards.

In this illustrated embodiment, a first mutable component 252 of the award defines a numerical value for a number of symbols needed to win one of the progressive awards. A second mutable component 254 of the award defines a symbol type needed to win one of the progressive awards. In some embodiments, one possible value for the second mutable component 254 is "ALL" or "ANY" where any symbol forming a symbol combination specified by the other mutable award components 252, 256, 258 is active for the mutable award. A third mutable component 256 of the award defines a payline that the symbols need to appear on to win one of the progressive awards. In some embodiments, one possible value for the third mutable component 256 is "ALL" or "ANY" where every played payline is active for the mutable award. A fourth mutable component 258 of the award defines which of the progressive awards is available to be won. Although this fourth mutable component 258 is shown as a number to define which progressive award is won, it may specify a progressive name in other embodiments, such as one of Mega, Major, Minor, or Mini Taken together, the mutable award components define an award where: (first mutable component 252) number of (second mutable component 254) symbols from left to right on played payline (third mutable component 256) awards progressive (fourth mutable component 258).

Figure 2A:
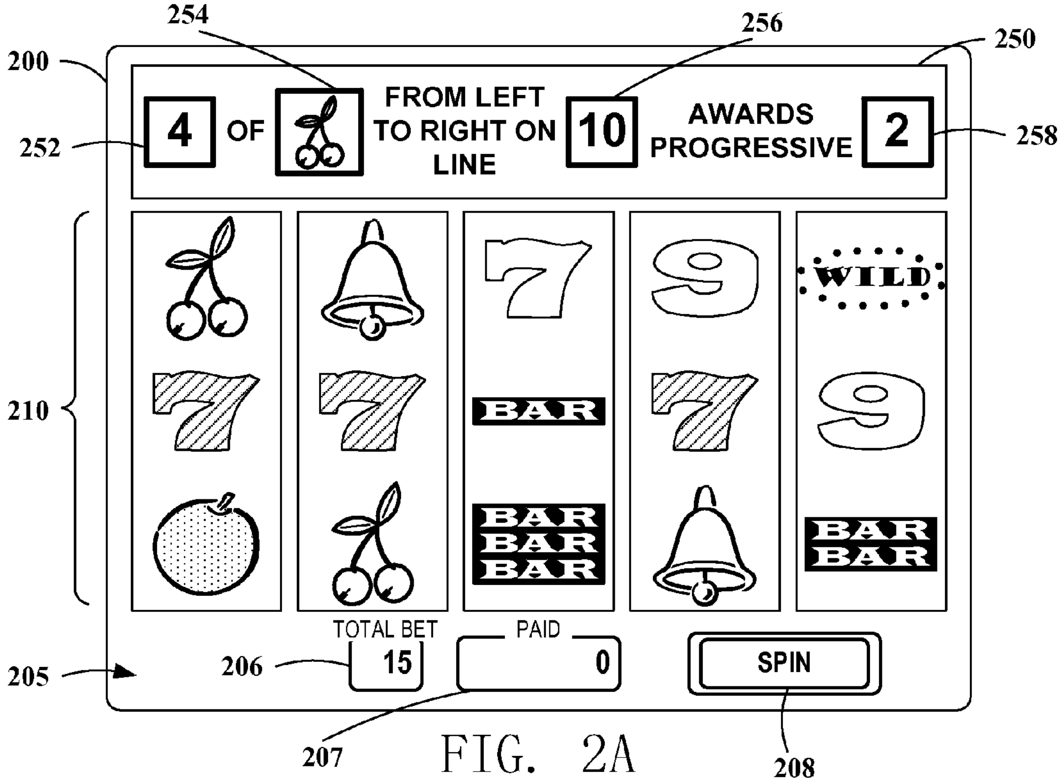
FIGS. 2A, 2B, 2C, and 2D are detail diagrams of a game display illustrating a game progression of an example gaming device having mutable awards according to embodiments of the invention.
Figure 2B:
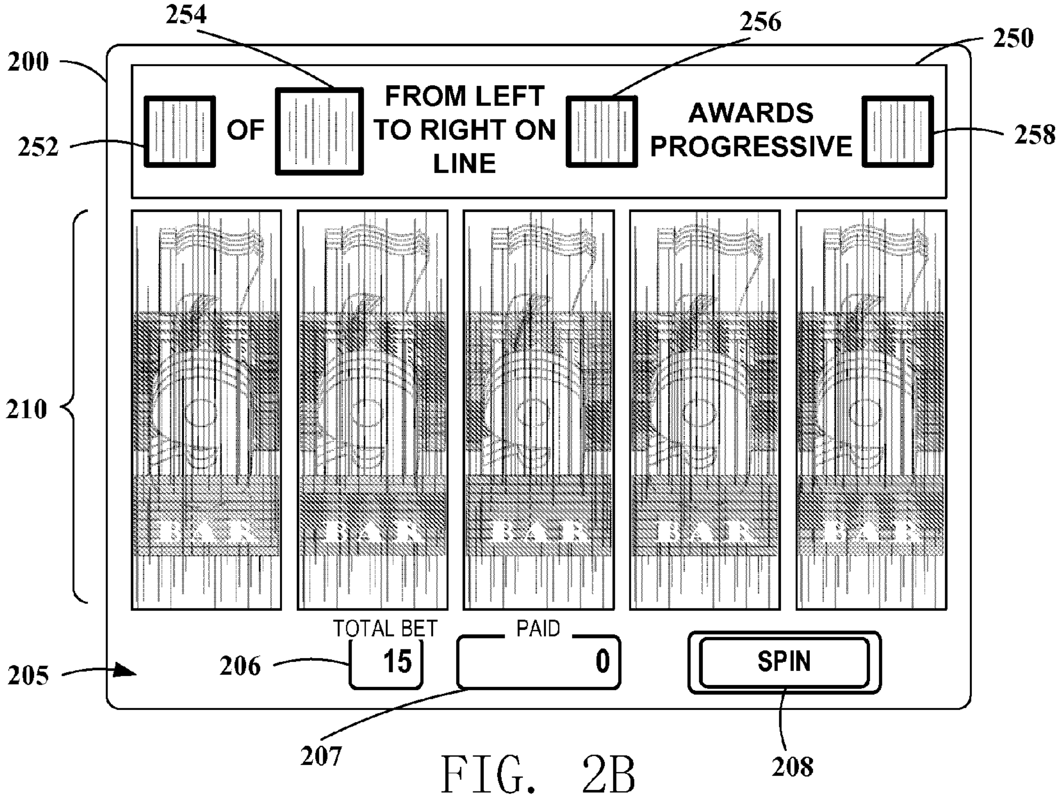
Figure 2C:
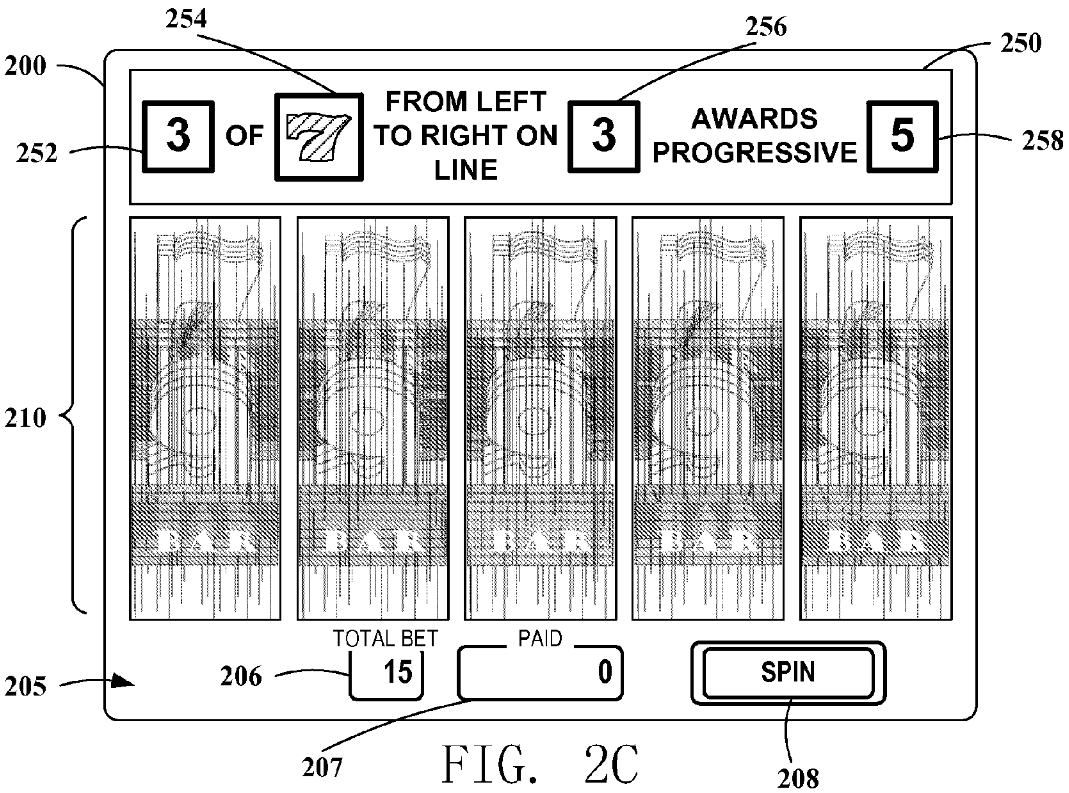
Figure 2D:
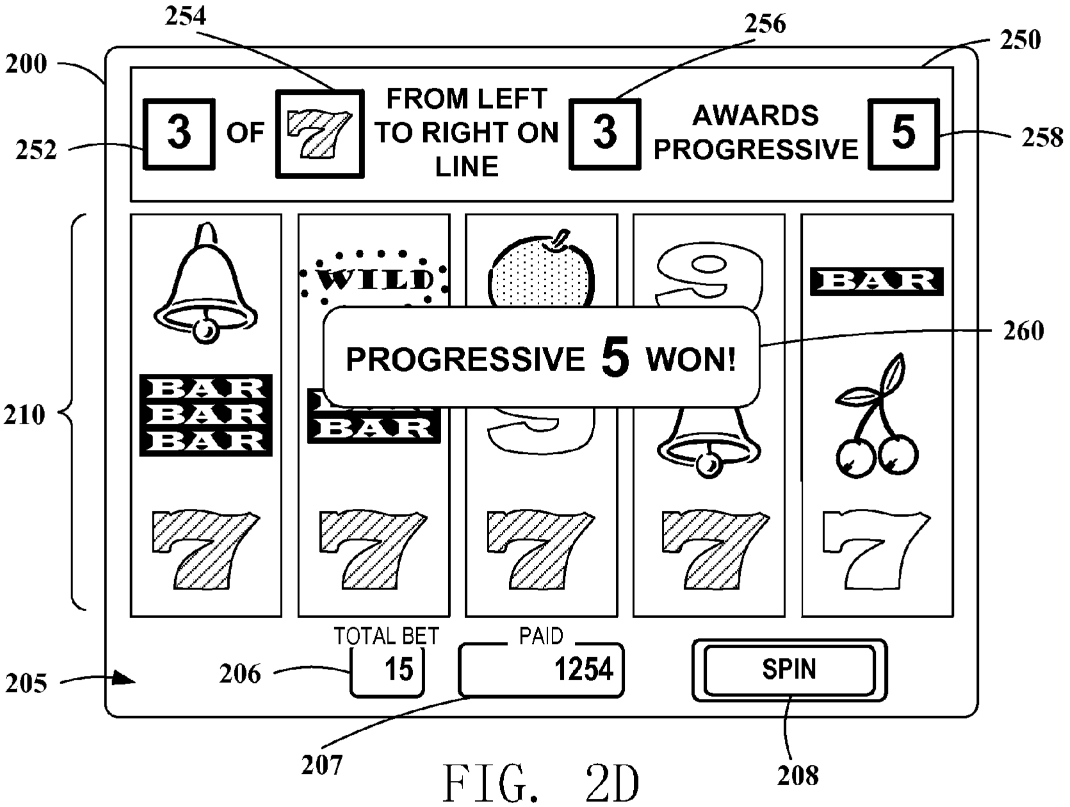

FIG. 2A shows a game display 200 between played game events where the game play grid 210 shows the outcome of the last game event, and the messaging portion 250 shows the last defined mutable award. Here, the last defined mutable award required four cherry symbols to appear from left to right on played payline 10 to win the second progressive award. FIG. 2B shows the game display 200 after initiation of a next gaming event. Here, the game reels in the game play grid 210 are spun, and the mutable components 252, 254, 256, 258 of the mutable award are changed. In this embodiment, the mutable components 252, 254, 256, 258 of the mutable award are given spinning animation where the outcomes are on independent reels. In other embodiments, however, the mutable components 252, 254, 256, 258 may change immediately or use other visual and/or auditory procedures. In FIG. 2C, the mutable components 252, 254, 256, 258 have outcome values displayed while the game reels in the game play grid 210 are still spinning. By displaying the mutable components 252, 254, 256, 258 prior to displaying the game outcome for the gaming event, the player can root for a particular game outcome as the reels come to rest in the game play grid 210. In other embodiments, however, the mutable components 252, 254, 256, 258 may be revealed substantially contemporaneously with the game outcome on the game play grid 210, or may be revealed after the game outcome on the game play grid is displayed. In yet other embodiments, mutable awards may be displayed after one or more of the game reels comes to rest. In some of these embodiments, the outcome of the first game reel may at least in part determine a mutable award to be displayed.

As shown in FIG. 2C, the mutable award in the messaging portion 250 for this gaming event requires three shaded-7 symbols to appear from left to right on payline 3 in order to win the fifth progressive award. In FIG. 2D, the game reels have come to rest in order to show the game outcome in the game play grid 210. As shown in FIG. 2D, four shaded-7 symbols have landed on the bottom position of game reels 1, 2, 3, and 4, respectively, which is the location of payline 3. Hence, the player has won the fifth progressive award, which is shown in message box 260. The award amount for the fifth progressive as well as the other award values for the winning symbol combinations appearing on the game play grid are provided to the player as shown in the Paid meter 207. In this embodiment, the fact that the player received four shaded-7 symbols on payline 3 rather than only three does not make a difference in awarding the mutable award. In other embodiments, however, the player may need to receive exactly three of the specified symbols to win the mutable award.

One possible effect of this mutable award technique is that larger awards that have very small probabilities of hitting can appear to be more winnable as additional methods of winning them can be defined and shown as the mutable award. Additionally, as the mutable awards themselves can drastically change between games, the ease of winning the mutable award may change from gaming event to gaming event. For example, a three symbol win on any payline may be much easier to win than a 5 symbol win on a particular payline with a particular symbol. The particular values available to be shown in the mutable award components 252, 254, 256, 258 may be selected to emphasize particular types of awards or game outcomes. While these values may be chosen completely at random, they may also appear in weighted tables so that some types of values appear more often in the mutable award components 252, 254, 256, 258. For example, the possible values for the first mutable component may be 1, 2, 3, 4, and 5. However, the values 1 and 5 may be weighted less than 2, 3, and 4, so they do not appear as often. Other weighting techniques or composition of possible values for the mutable award components 252, 254, 256, 258 may be used in different embodiments. As discussed above, and shown in some of the following embodiments, other types of mutable awards may be even easier to win, even in some instances by just appearing in the messaging portion 250.

In other embodiments, the mutable award may require the absence of a condition occurring on a gaming device to trigger the award. For example, a mutable award may specify that an award of 50 bonus credits will be provided if no bar symbols (single bar symbols, double bar symbols, and triple bar symbols) appear on a game play grid for a game outcome. Additionally, rules for a mutable award may combine different triggering requirements. For example, a mutable award may specify that an award of 50 bonus credits will be provided if no bar symbols appear on a game play grid, and that at least one cherry symbol appears on the game play grid for a game outcome.

Mutable rules may also be cascaded upon each other. For example, because the mutable award in FIG. 2D was won with shaded-7 symbols, the mutable award for the next game may offer a similar criterion to win the next higher progressive award. That is, the mutable award for the next gaming event may be 3 shaded-7 symbols from left to right on payline 3 will trigger and pay the fourth-level progressive (Progressive 4). These cascading dependencies could be defined in the mutable award rules used to define the parameters of the mutable awards.

Referring to FIGS. 3A-3D, a gaming display 300 includes a status and command portion 305, a game play grid 310, and a messaging portion 350. The status and command portion 305 may include various meters or displays, such as a Total Bet meter 306 and a Paid Meter 307, as well as interactive buttons or other controls, such as a Spin button 308. The game play grid 310 in this embodiment shows portions of five game reels used in a video slot game. In other embodiments, however, the game grid 310 may include mechanical reels, video poker hands, or other display elements to show gaming events on the display 300. The messaging portion 350 can communicate various data or information to a player at the gaming device. In these embodiments, messaging portion 350 displays information regarding mutable awards associated with gaming events on the game display 300. However, the messaging portion 350 may also be used to show a title or theme of the game, show advertisements, show game stats or information, communicate game play options or pays, or display any other type of information or data.

In the embodiment shown in FIGS. 3A-3D, the messaging portion 350 displays information about an award that again has multiple mutable components. In this particular embodiment, the mutable components 352, 354, 356 help define a multiplier value to be assigned to a payline (or all paylines) for a number of future games. While this embodiment specifies a mutable award for each game event, other embodiments may not provide a mutable award for one or more gaming events. In these instances, the mutable award information may be removed from the messaging portion 350, or the mutable award components 352, 354, 356 may be blank or have other non-value data entered into them.

Figure 3A:
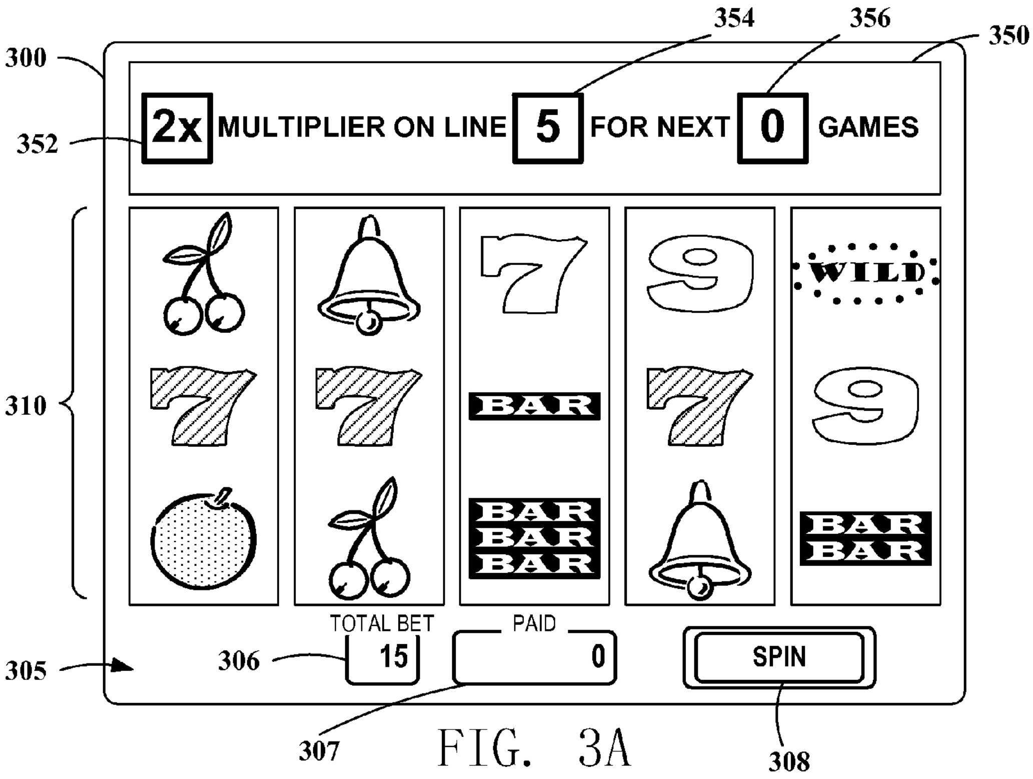
FIGS. 3A, 3B, 3C, and 3D are detail diagrams of a game display illustrating another game progression of an example gaming device having mutable awards according to embodiments of the invention.
Figure 3B:
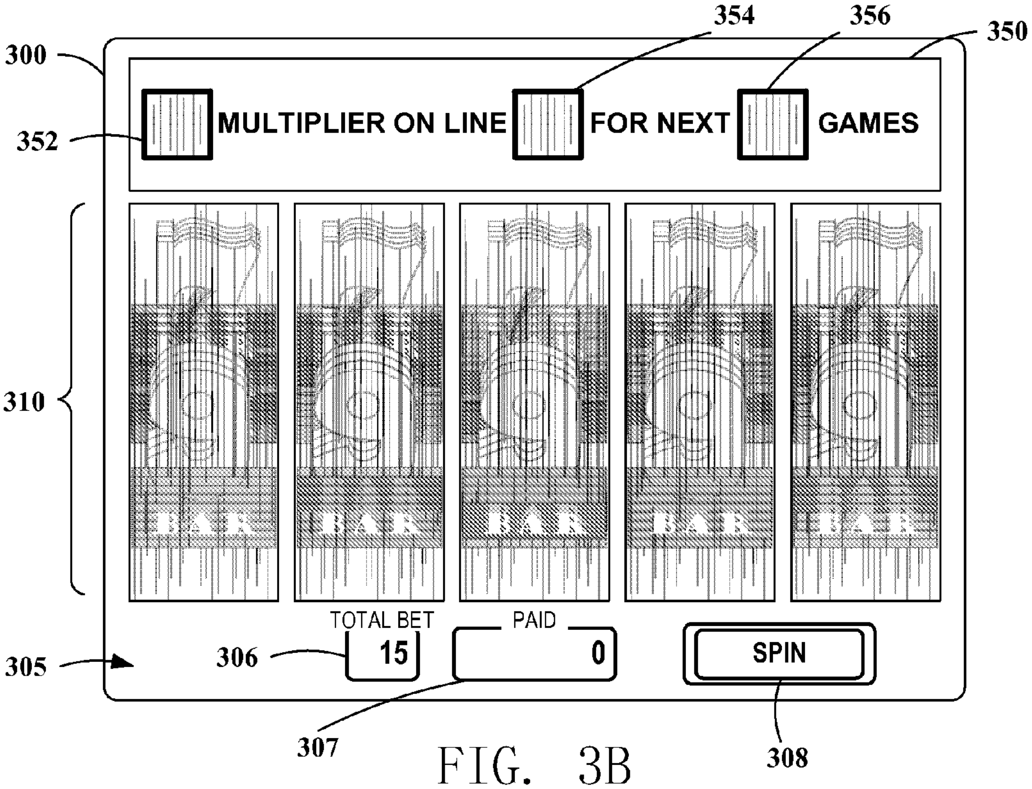

FIG. 3A shows a game display 300 between played game events where the game play grid 310 shows the outcome of the last game event, and the messaging portion 350 shows the last defined mutable award. Here, the last defined mutable award specified that the award for any winning symbol combination on payline 5 would be modified by a "2×" multiplier. As shown by the third mutable component 356, the next game will not receive this mutable award, and a new mutable award will be determined for the next game. As discussed above, in other embodiments, no mutable award may be specified for some gaming events. FIG. 3B shows the game display 300 after initiation of a next gaming event. Here, the game reels in the game play grid 310 are spun, and the mutable components 352, 354, 356 of the mutable award are changed. In this embodiment, the mutable components 352, 354, 356 of the mutable award are given spinning animations where the possible outcomes are on independent reels.

Figure 3C:
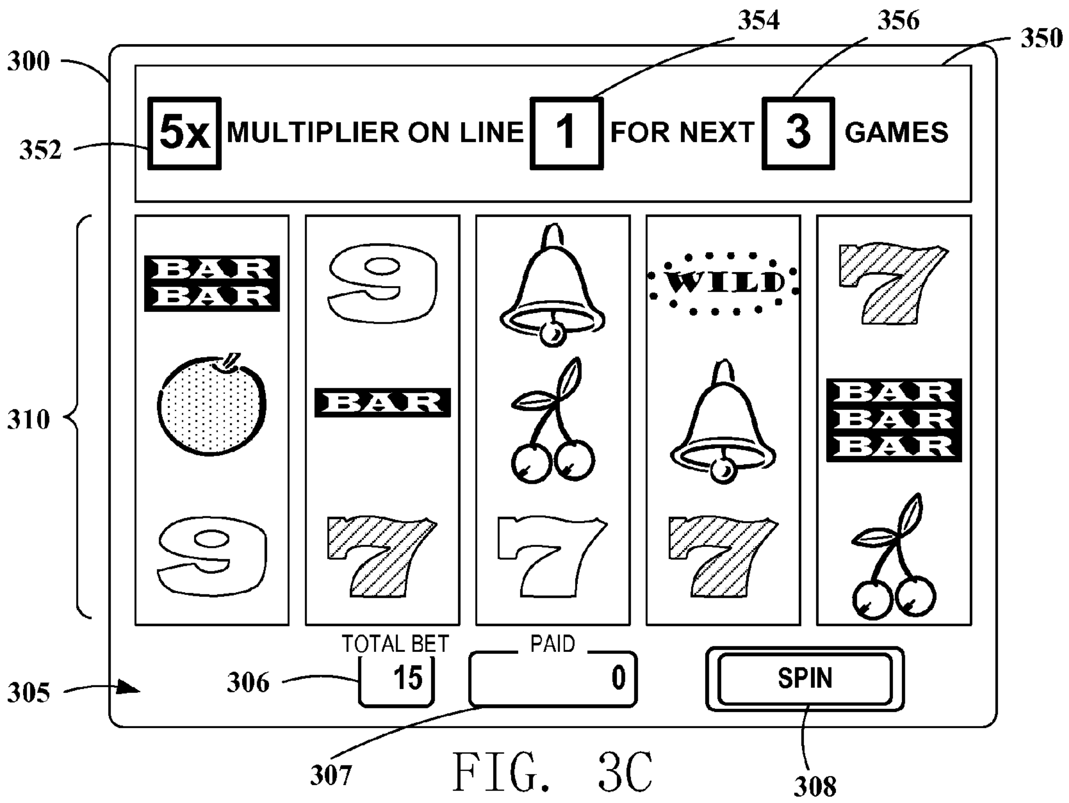
Figure 3D:
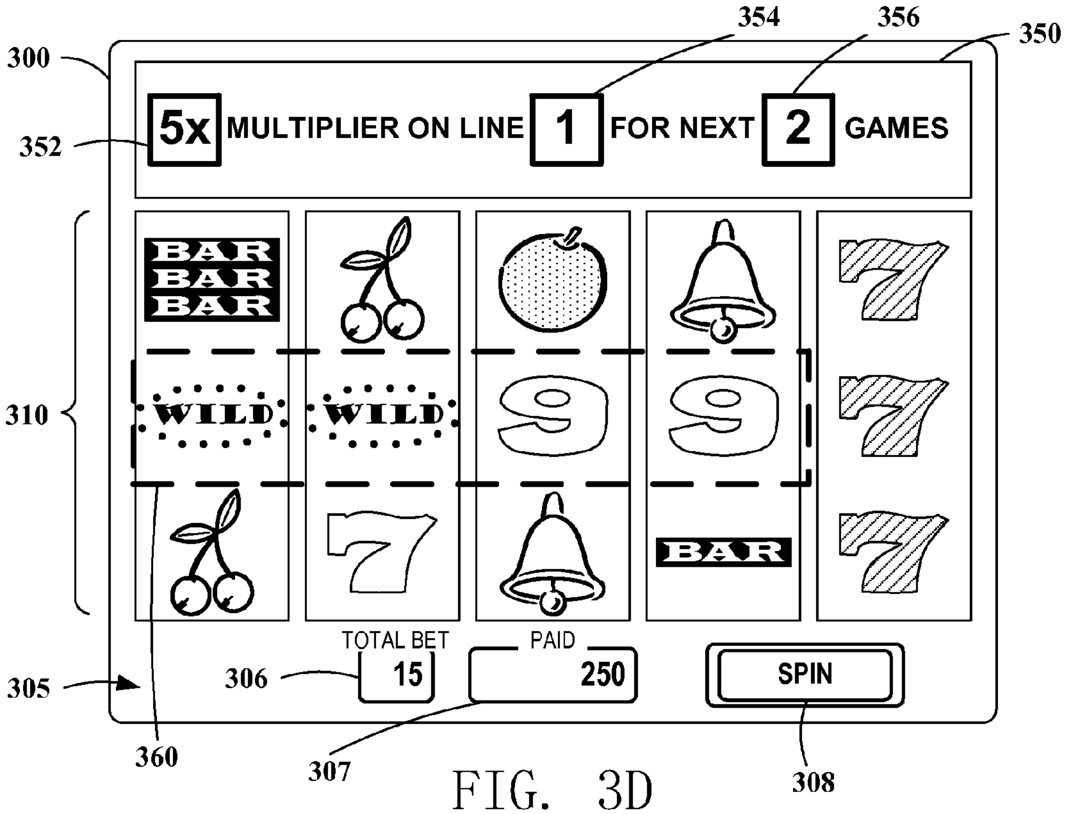

In FIG. 3C, the mutable components 352, 354, 356 and the game reels in the game play grid 310 have outcomes displayed. As discussed above, the outcome values of the mutable components 352, 354, 356 may be displayed prior to displaying the game outcome on the game play grid 310. Here, the mutable award shown in the messaging portion 350 is specified as a "5×" multiplier for any awards of winning symbol combinations on payline 1. Additionally, it is specified that this mutable award will be good for the next 3 games. In this game outcome, however, a winning symbol combination is not received on payline 1. Hence, the mutable award is not won or used. In FIG. 3D, the result of the next gaming event is shown on the game display 300. Here, the third mutable component 356 in the messaging portion 350 has been modified to show that only two games remain with this mutable award. However, the first and second mutable components 352, 354 have not been changed or mutated. In this game outcome shown on the game play grid 310, a winning symbol combination 360 is received on payline 1, the center horizontal payline in the game play grid. The 50 credit award for this four symbol pay is multiplied by the "5×" multiplier specified by the mutable award, and a total award of 250 credits is provided to the player as shown in the Paid meter 307.

Referring to FIGS. 4A-4D, a gaming display 400 includes a status and command portion 405, a game play grid 410, and a messaging portion 450. The status and command portion 405 may include various meters or displays, such as a Total Bet meter 406 and a Paid Meter 407, as well as interactive buttons or other controls, such as a Spin button 408. The game play grid 410 in this embodiment shows portions of five game reels used in a video slot game. In other embodiments, however, the game grid 410 may include mechanical reels, video poker hands, or other display elements to show gaming events on the display 400. The messaging portion 450 can communicate various data or information to a player at the gaming device. In these embodiments, messaging portion 450 displays information regarding mutable awards associated with gaming events on the game display 400. However, the messaging portion 450 may also be used to show a title or theme of the game, show advertisements, show game stats or information, communicate game play options or pays, or display any other type of information or data.

In the embodiment shown in FIGS. 4A-4D, the messaging portion 450 displays information about an award that again has multiple mutable components. In this particular embodiment, the mutable components 452, 454 help define bonus credits received for a specified symbol appearing on the game play grid 410. However, unlike the previous two illustrated embodiments, the mutable award is not provided in every gaming event in this embodiment. This can be seen in FIG. 4A, where the messaging portion 450 shows the game name instead of any mutable award.

Figure 4A:
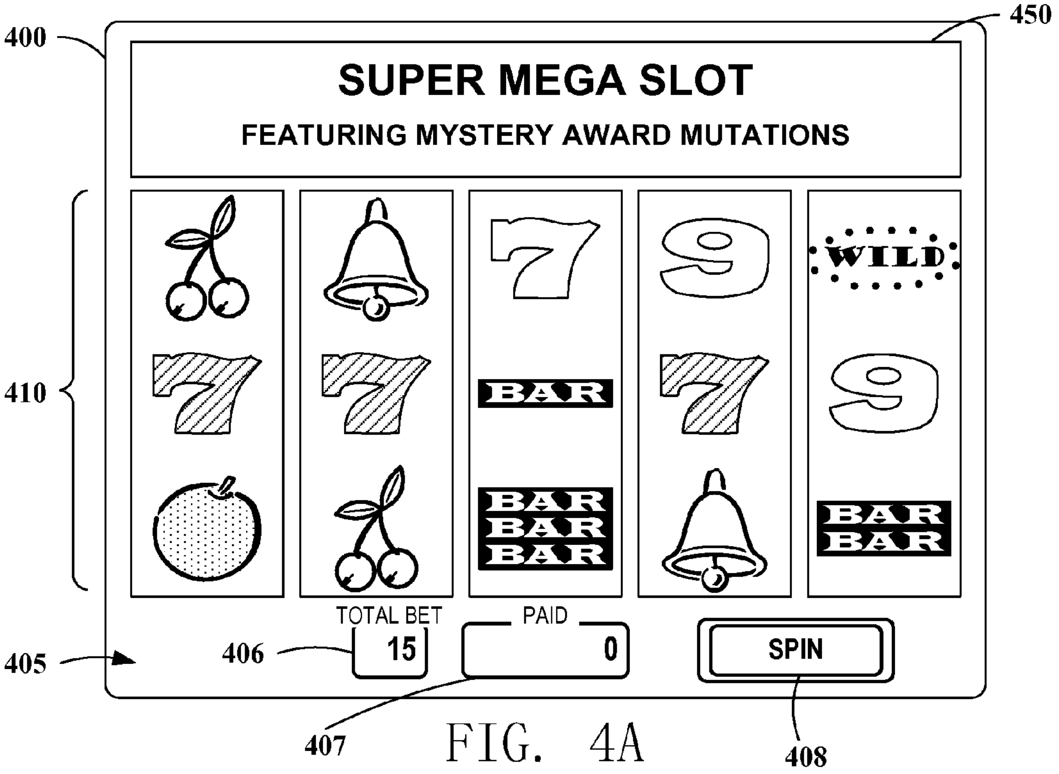
FIGS. 4A, 4B, 4C, and 4D are detail diagrams of a game display illustrating another game progression of an example gaming device having mutable awards according to embodiments of the invention.
Figure 4B:
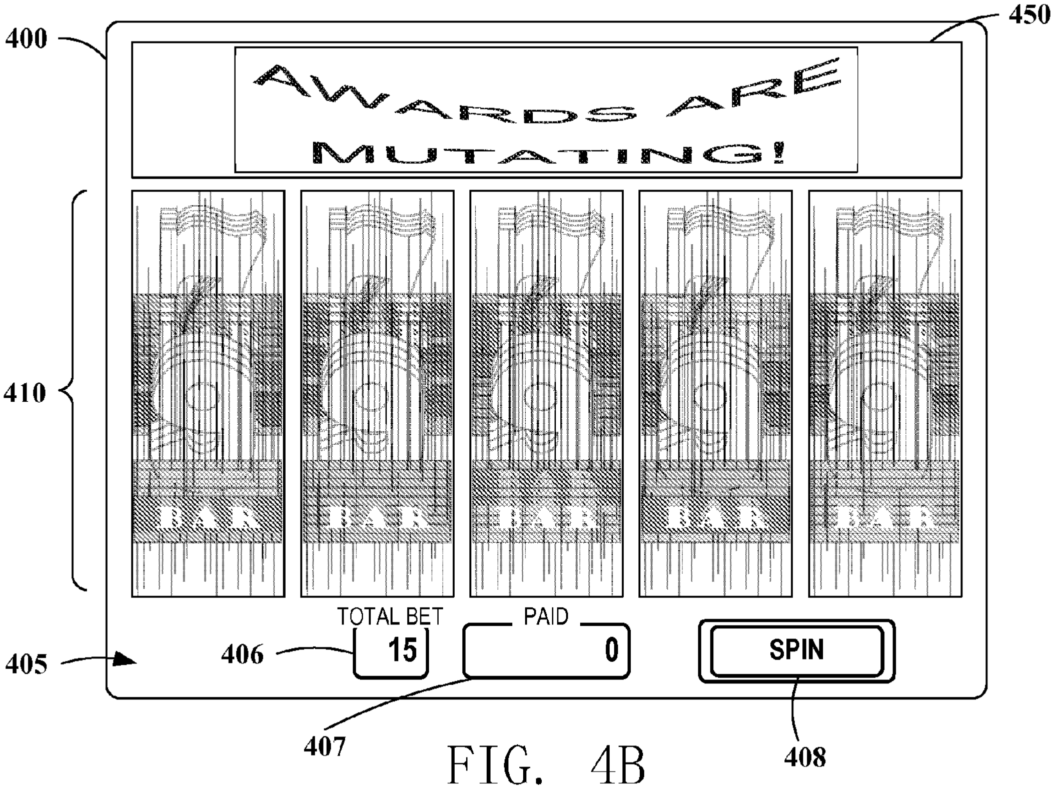
Figure 4C:
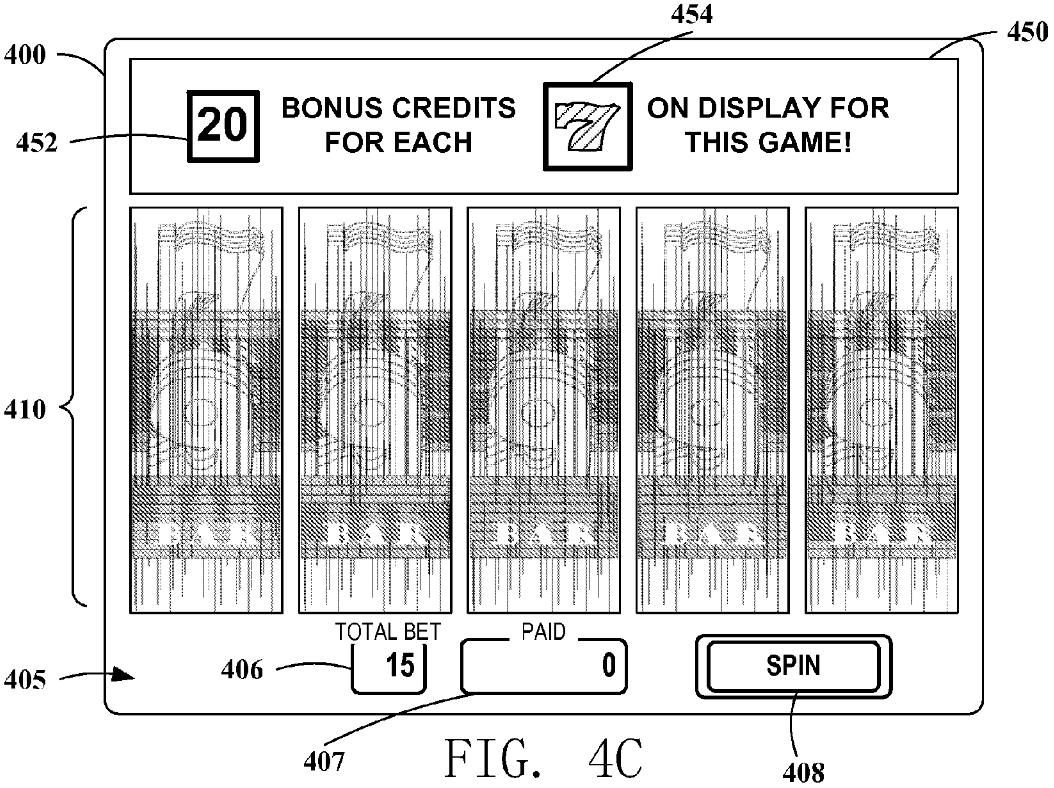

In particular, FIG. 4A shows a game display 400 between played game events where the game play grid 410 shows the outcome of the last game event, and the messaging portion 450 shows either the last defined mutable award or other game information if a mutable award was not defined for the previous gaming event. Here, a mutable award was not specified for the last gaming event. Hence, the messaging portion 450 does not show any mutable award. FIG. 4B shows the game display 400 after initiation of a next gaming event. Here, the game reels in the game play grid 410 are spun. During this reel spinning an animation is displayed in the messaging portion 450 to show that a mutable award is coming In FIG. 4C this animation in the messaging portion 450 has ended with the display of a mutable award with first and second mutable components 452, 454. In this instance, the mutable award specifies that 20 bonus credits will be awarded for each shaded-7 symbol that appears on the game play grid 410 as part of the game outcome for the current gaming event.

Figure 4D:
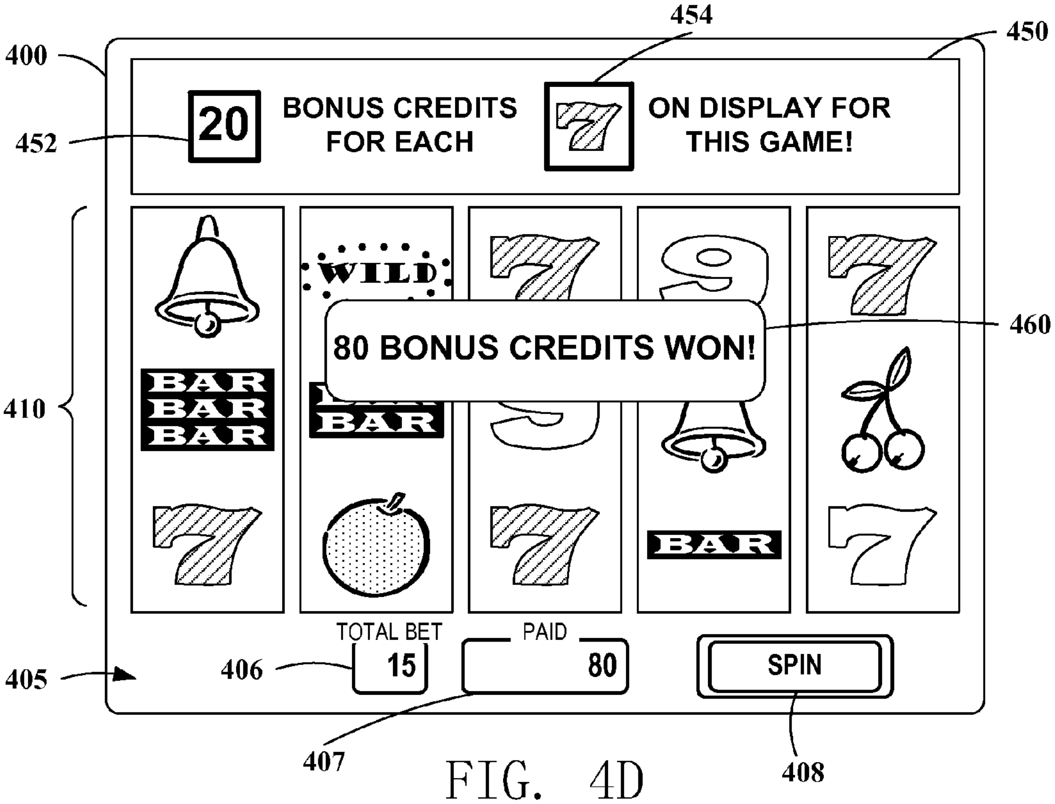

In FIG. 4D, the game reels have come to rest to display the game outcome of the gaming event in the game play grid 410. As shown, four shaded-7 symbols appear on the game play grid 410. As these symbols are associated with a bonus credit value in the mutable award shown in the messaging portion, a total award of 80 credits is provided to the player as indicated in the Paid meter 407.

Referring to FIGS. 5A-5L, a gaming display 500 includes a status and command portion 505, a game play grid 510, and a messaging portion 550. The status and command portion 505 may include various meters or displays, such as a Total Bet meter 506 and a Paid Meter 507, as well as interactive buttons or other controls, such as a Spin button 508. The game play grid 510 in this embodiment shows portions of five game reels used in a video slot game. In other embodiments, however, the game grid 510 may include mechanical reels, video poker hands, or other display elements to show gaming events on the display 500. The messaging portion 550 can communicate various data or information to a player at the gaming device. In these embodiments, messaging portion 550 displays information regarding mutable awards associated with gaming events on the game display 500. However, the messaging portion 550 may also be used to show a title or theme of the game, show advertisements, show game stats or information, communicate game play options or pays, or display any other type of information or data.

In the embodiment shown in FIGS. 5A-5L, the messaging portion 550 displays information about a mutable award that can change from game to game. In this particular embodiment, the mutable components of the award are part of the award message itself that can change with every gaming event. Unlike the above illustrated embodiments, the mutable award in this embodiment varies in scope between multiple different types of awards. Additionally, the mutable award is not necessarily provided in every gaming event in this embodiment.

Figure 5A:
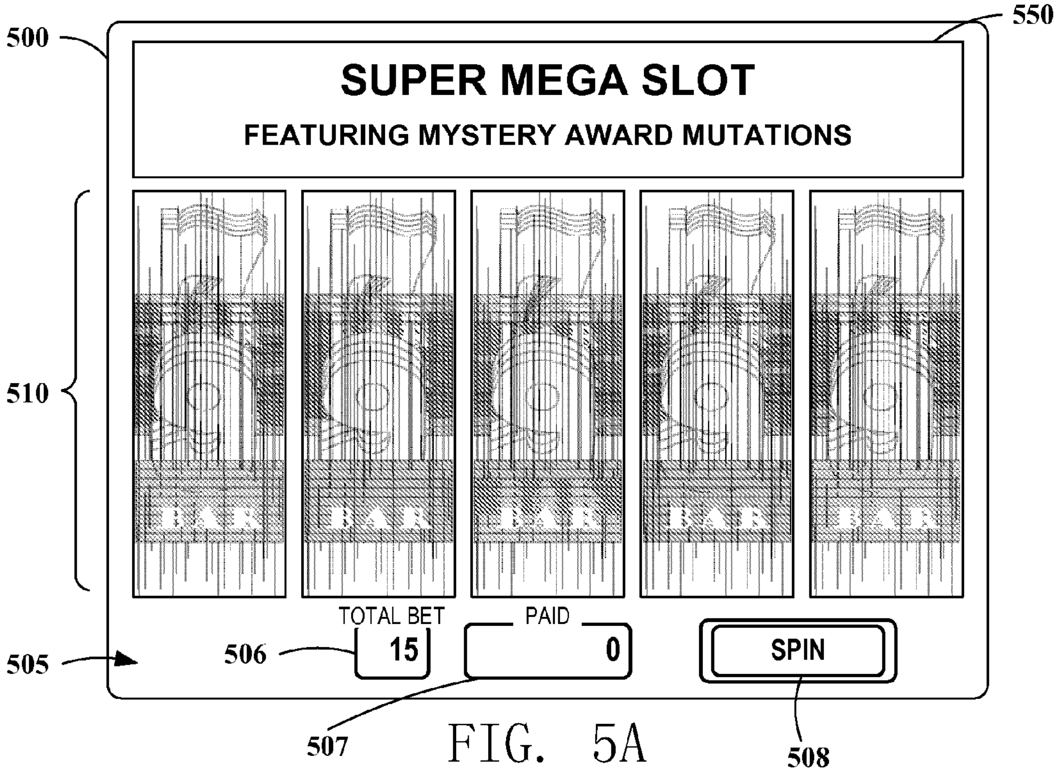
FIGS. 5A, 5B, 5C, 5D, 5E, 5F, 5G, 5H, 5I, 5J, 5K, and 5L are detail diagrams of a game display illustrating another game progression of an example gaming device having mutable awards according to embodiments of the invention.

FIG. 5A shows a game display 500 after a gaming event has been initiated where the game play grid 510 shows the game reels spinning. The messaging portion 550 shows that a mutable award was not provided for the last gaming event, as it shows game information rather than a mutable award. During this gaming event, however, the contents of the messaging portion 550 changes to reveal a mutable award for the next game. In this embodiment, this change in the contents of the messaging portion 550 occurs while the game reels are spinning to build player anticipation and allow them to root for specific game outcomes.

Figure 5B:
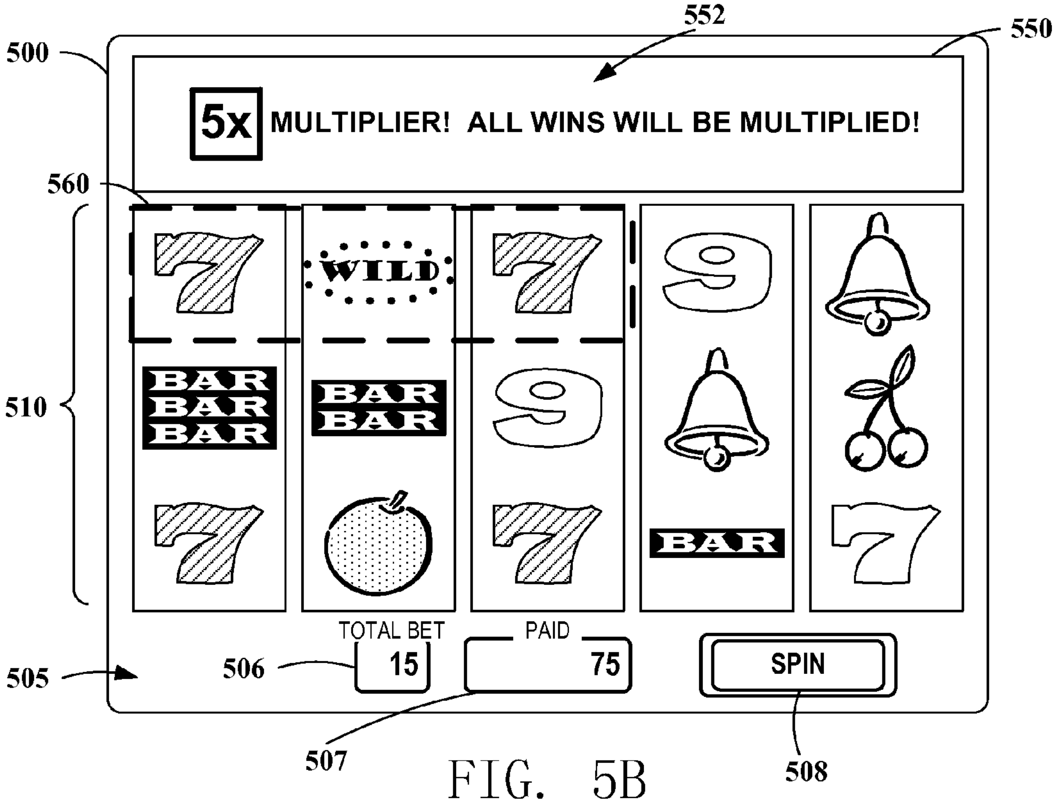

In FIG. 5B, the game reels have come to rest to show a game outcome in the game play grid 510. Additionally, as mentioned above, the mutable award 552 is displayed in the messaging portion for this game event. In this instance, the mutable award 552 specifies a "5×" multiplier for all awards won in the gaming outcome. Here, the player has received a winning symbol combination 560 of three shaded-7 symbols on a played payline. The 15 credit award corresponding to this three symbol pay is then multiplied by the "5×" specified by the mutable award 552, and the total award of 75 credits is provided to the player as indicated in the Paid meter 507.

Figure 5C:
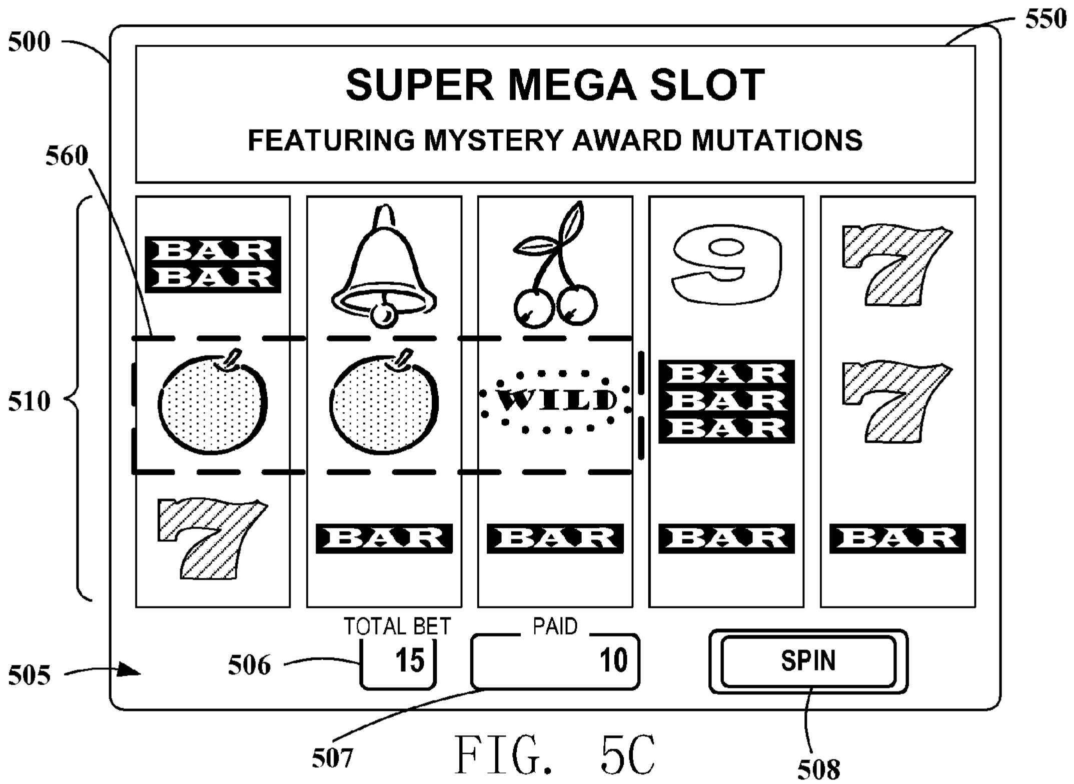

In FIG. 5C, the result of the next gaming event is shown. In this instance, a mutable award was not provided for the gaming event, and the messaging portion 550 shows other game information rather than a mutable award. Although no mutable award was specified for this gaming event, the player did receive a winning symbol combination 560 of three orange symbols. The 10 credit award associated with this three symbol combination is provided to the player, as indicated by the Paid meter 507.

Figure 5D:
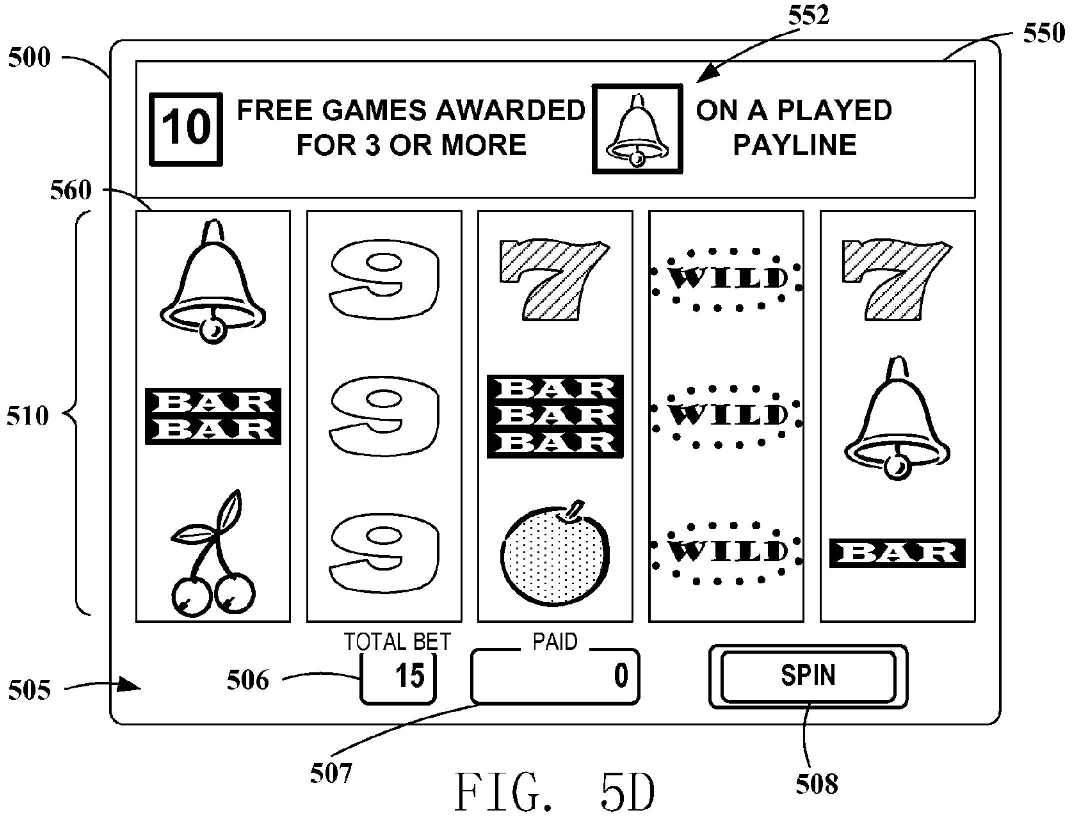

In FIG. 5D, the result of the next gaming event is shown. In this instance, a mutable award 552 is specified for the gaming event, as shown in the messaging portion 550. Here, the mutable award specifies that a bonus of 10 free games or free spins will be awarded if three or more bell symbols are received on a played payline. The game outcome of the gaming event, however, does not include three bell symbols on a played payline, or any other winning symbol combination.

Figure 5E:
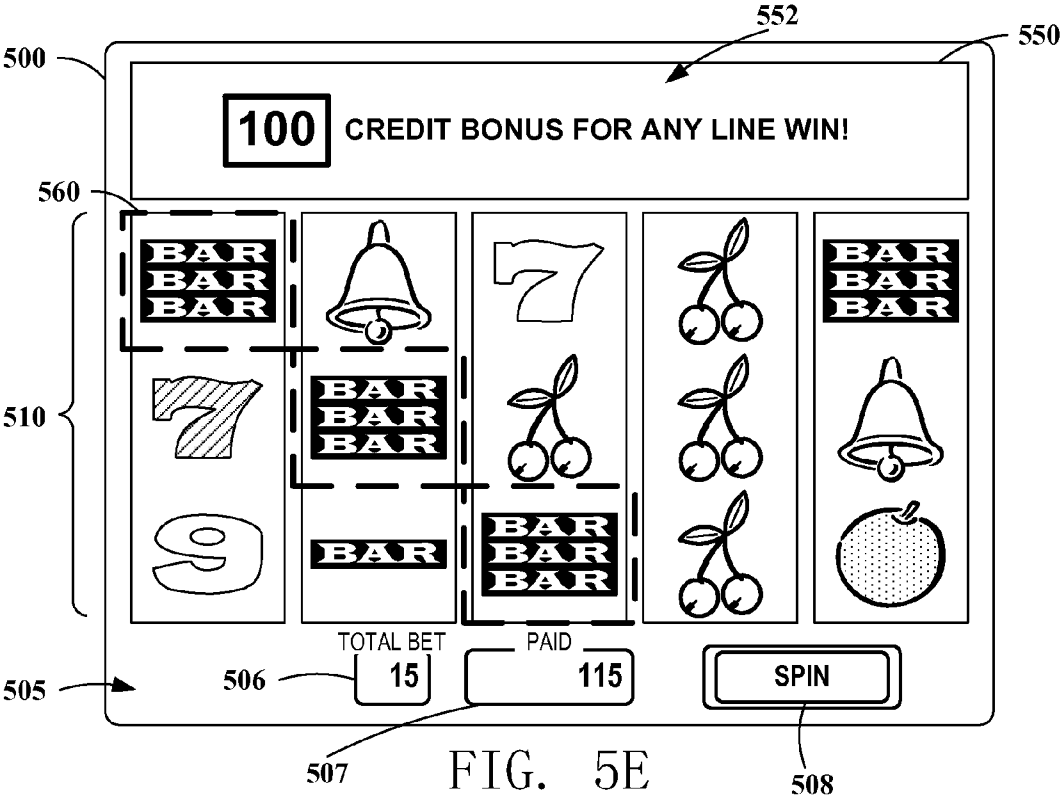

In FIG. 5E, the result of the next gaming event is shown. In this instance, a mutable award is specified for the gaming event, as shown in the messaging portion 550. Here, the mutable award specifies that a bonus of 100 credits will be provided for any line win. Since the player has received a winning symbol combination 560 of three triple-bar symbols, the player is awarded the 15 credits associated with this three symbol win as well as the mutable award of 100 credits for a total win of 115 credits, as indicated on the Paid meter 507.

Figure 5F:
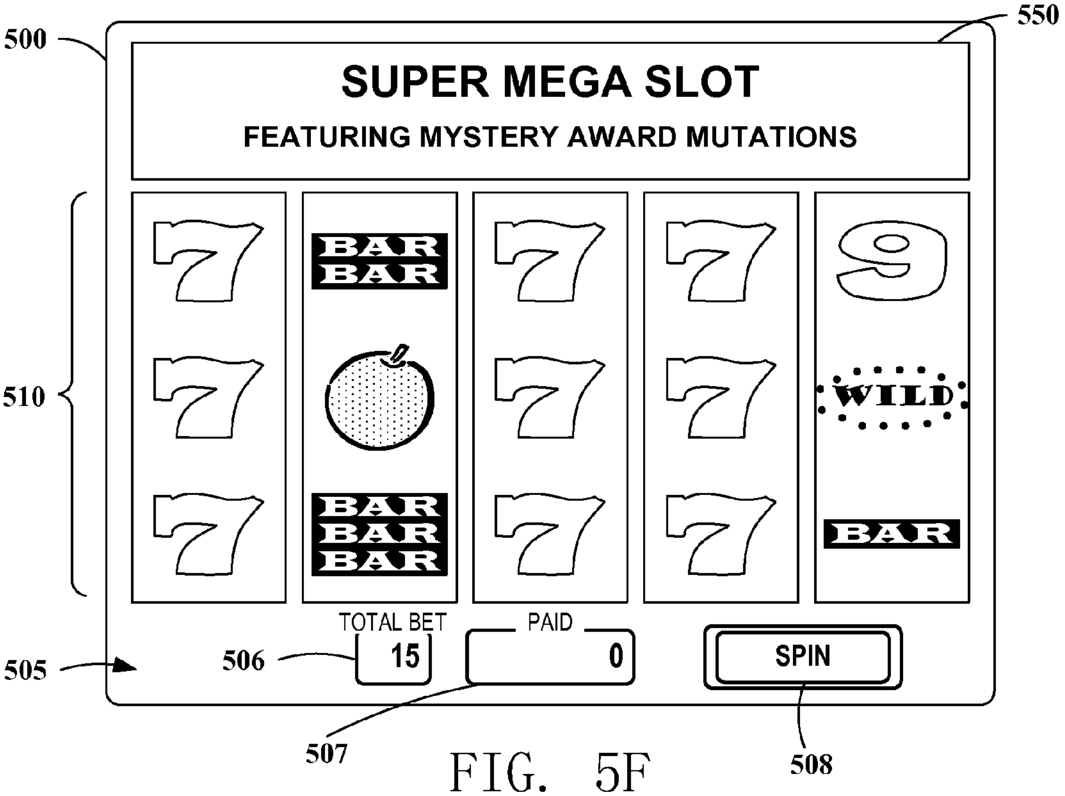

In FIG. 5F, the result of the next gaming event is shown. In this instance, a mutable award was not provided for the gaming event, and the messaging portion 550 shows other game information rather than a mutable award. Additionally, no winning symbol combinations were received in the game play grid 510. Hence, the player does not win any credits for this gaming event.

Figure 5G:
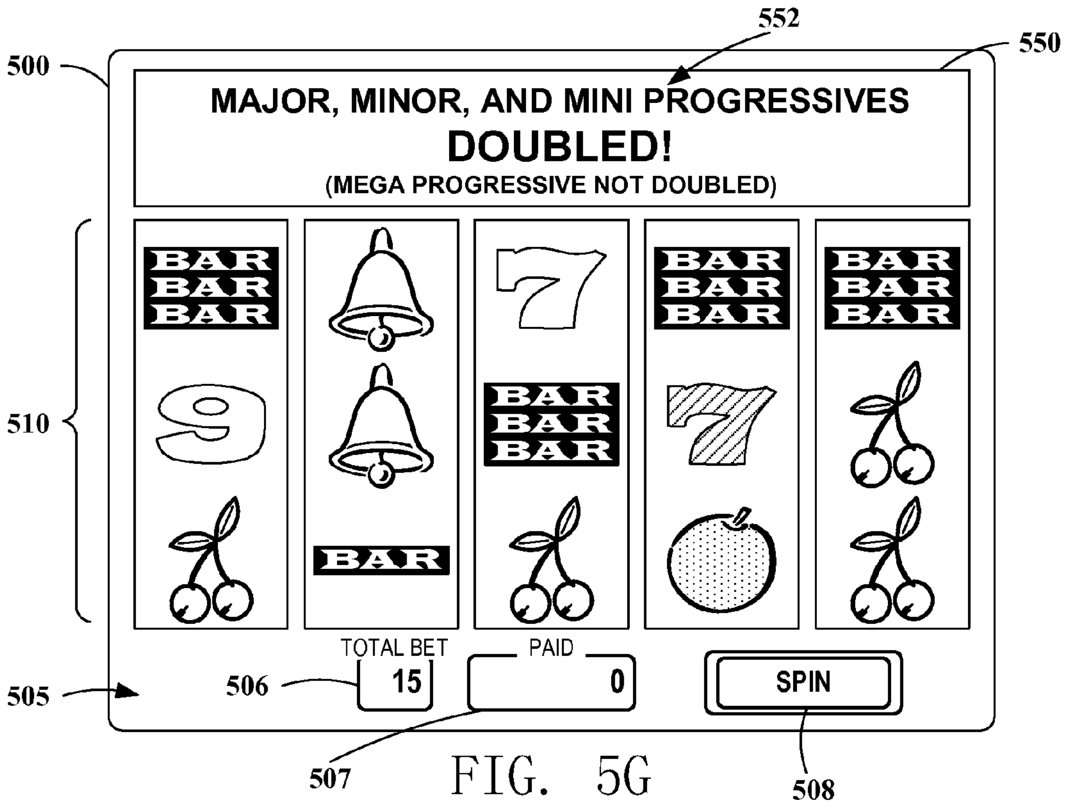

In FIG. 5G, the result of the next gaming event is shown. In this instance, a mutable award 552 is specified for the gaming event, as shown in the messaging portion 550. Here, the mutable award specifies that the value of the Major, Minor, and Mini Progressive awards will be doubled if they are won during this gaming event. Note that the top progressive award, the Mega Progressive, was specifically not included in this mutable award. In other instances, all of the progressive awards, or a fewer number of the progressive awards, may be specified by the mutable awards. The game outcome of the gaming event, however, does not result in any of the progressive awards being won.

Figure 5H:
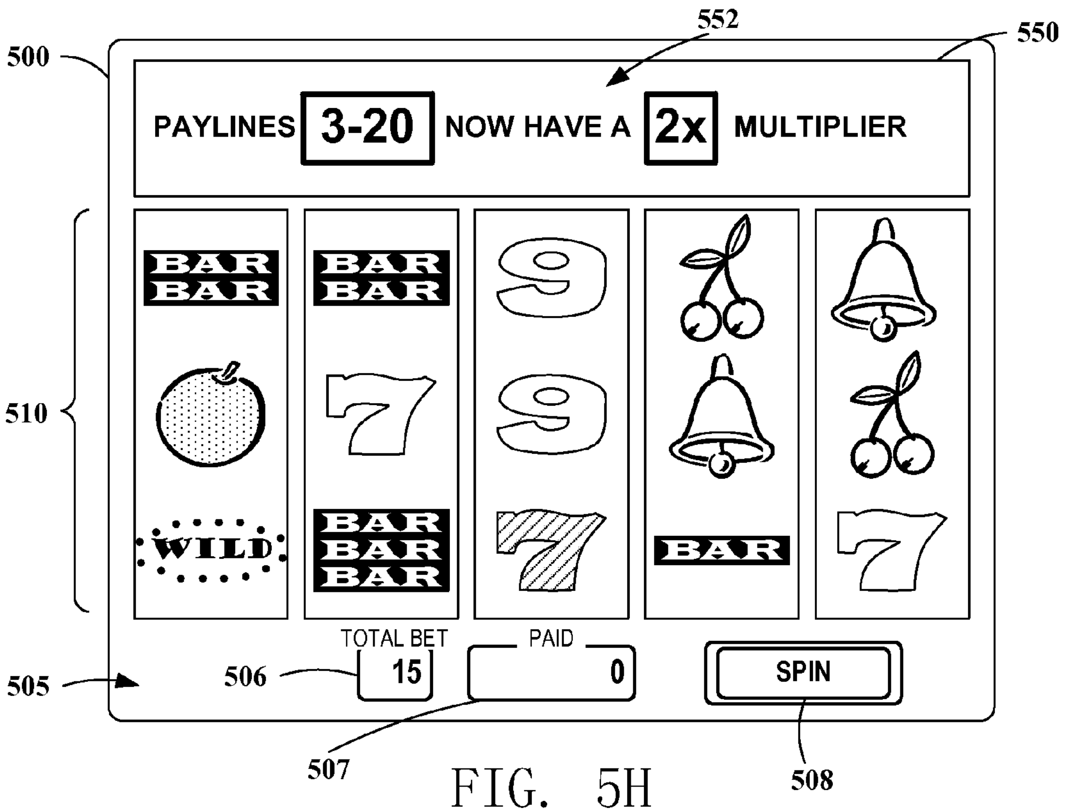

In FIG. 5H, the result of the next gaming event is shown. In this instance, a mutable award 552 is specified for the gaming event, as shown in the messaging portion 550. Here, the mutable award specifies any winning symbol combinations on paylines 3-20 will have their corresponding award values multiplied by a "2×" multiplier. The game outcome on the game play grid 510, however, indicates that no winning symbol combinations were received for any of the played paylines.

Figure 5I:
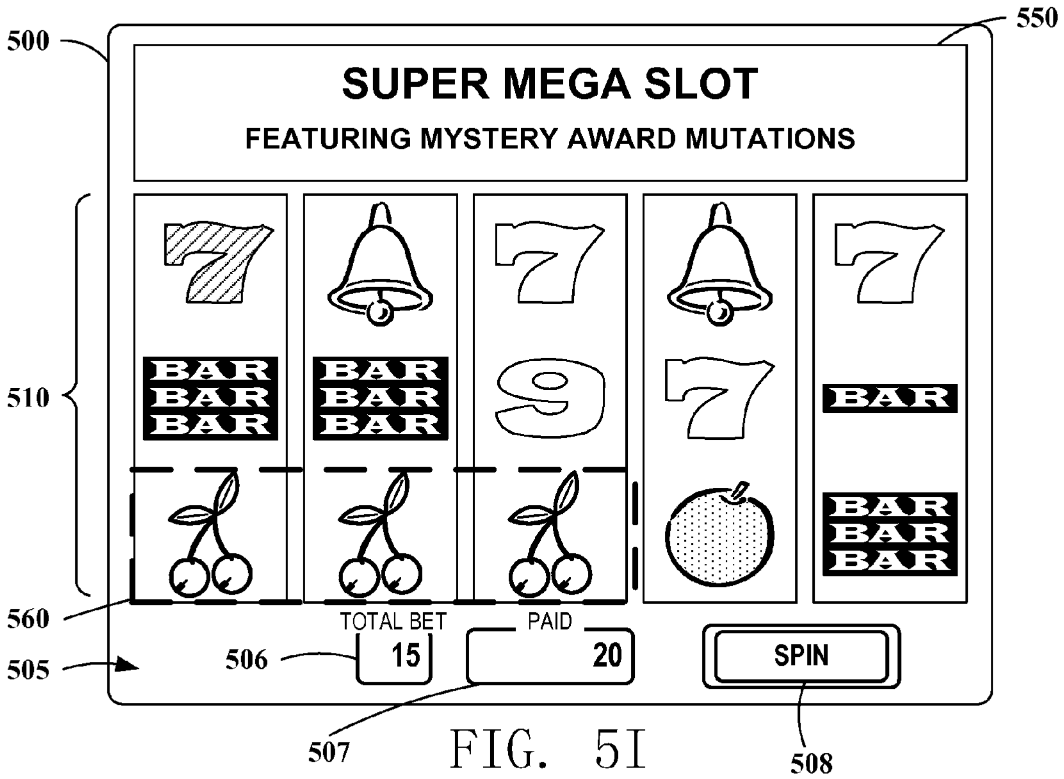

In FIG. 5I, the result of the next gaming event is shown. In this instance, a mutable award was not provided for the gaming event, and the messaging portion 550 shows other game information rather than a mutable award. Although no mutable award was specified for this gaming event, the player did receive a winning symbol combination 560 of three cherry symbols. The 20 credit award associated with this three symbol combination is provided to the player, as indicated by the Paid meter 507. Note that the previous mutable rule shown in FIG. 5H would have provided a "2×" multiplier for this award. However, because of the mutable nature of these mutable awards in this embodiment, the winning symbol combination 560 in this gaming event is not bonused.

Figure 5J:
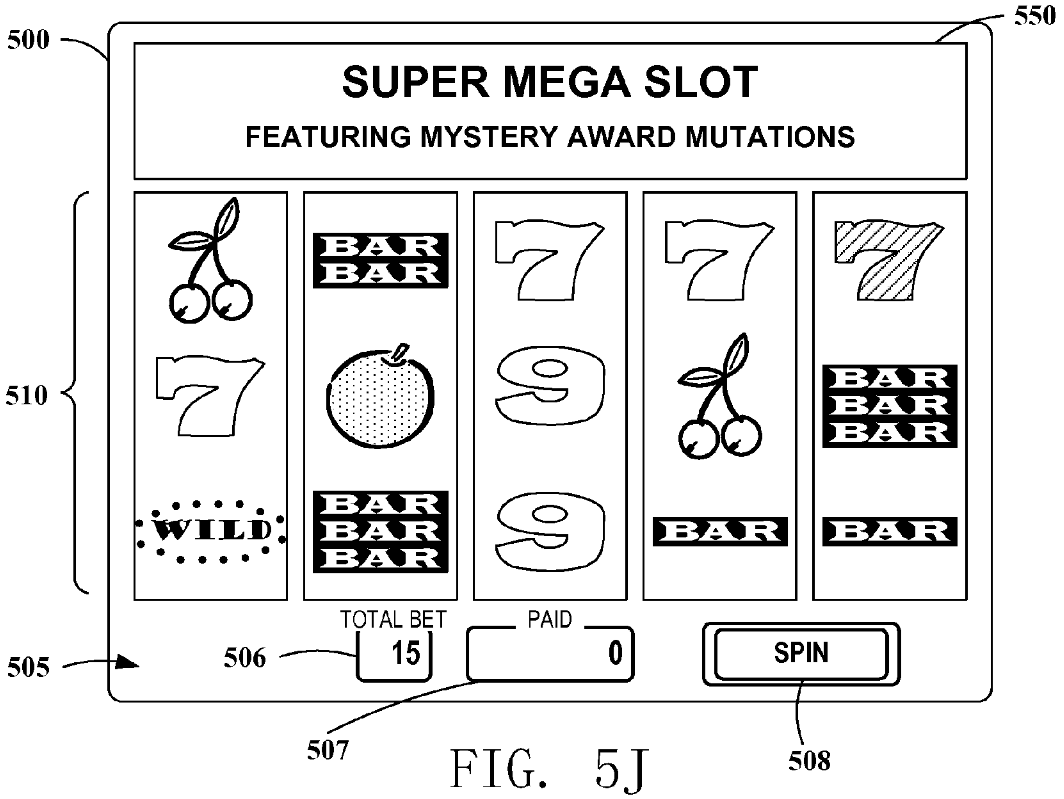

In FIG. 5J, the result of the next gaming event is shown. In this instance, a mutable award was not provided for the gaming event, and the messaging portion 550 shows other game information rather than a mutable award. Additionally, no winning symbol combinations were received in the game play grid 510. Hence, the player does not win any credits for this gaming event.

Figure 5K:
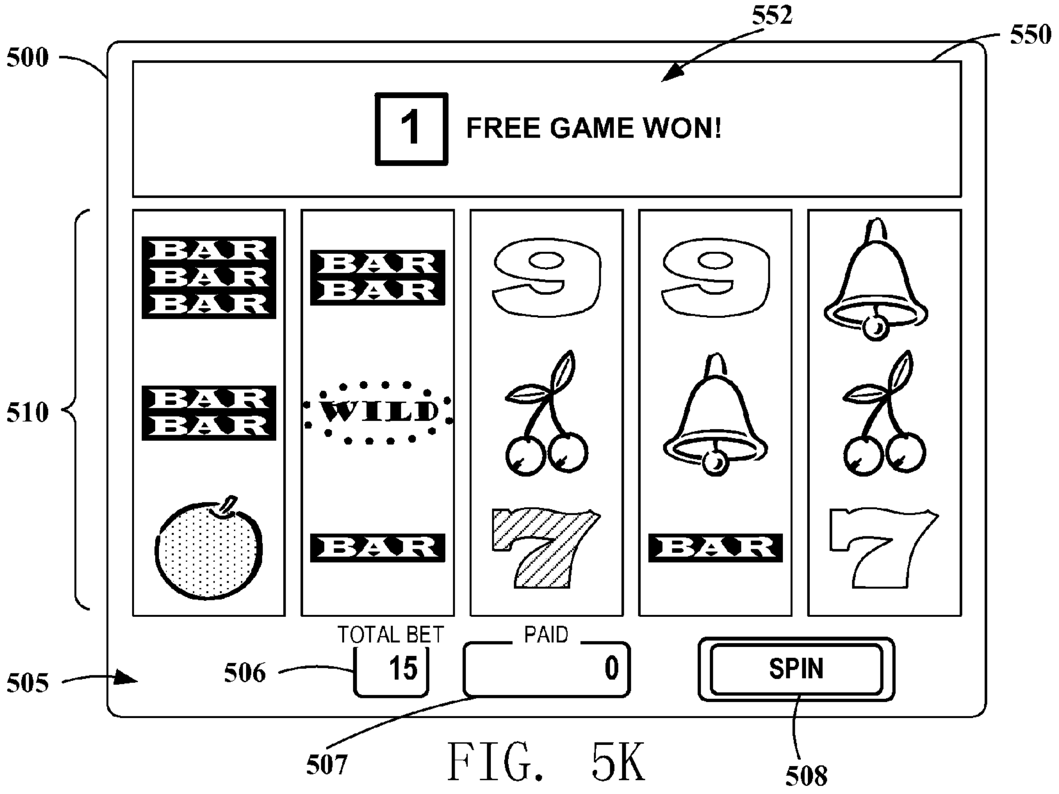

In FIG. 5K, the result of the next gaming event is shown. In this instance, a mutable award 552 is specified for the gaming event, as shown in the messaging portion 550. Here, the mutable award specifies that a free game has been awarded. This means that following the gaming event, the player gets a free spin or a free game. In some embodiments, this may be executed by going to a second screen free spin bonus where the reels may be different. In other embodiments, this may be executed by paying for any awards related to the displayed game outcome, re-spinning the reels, and paying for any wins on the re-spin. In yet other embodiments, this may be executed by not charging a wager when the next gaming event is initiated. In other embodiments, other types of free games or free spins game play techniques may be used. In this particular embodiment, the free game is executed by not requiring a wager for the next gaming event. The game outcome on the game play grid 510, however, indicates that no winning symbol combinations were received for any of the played paylines for the current gaming event.

Figure 5L:
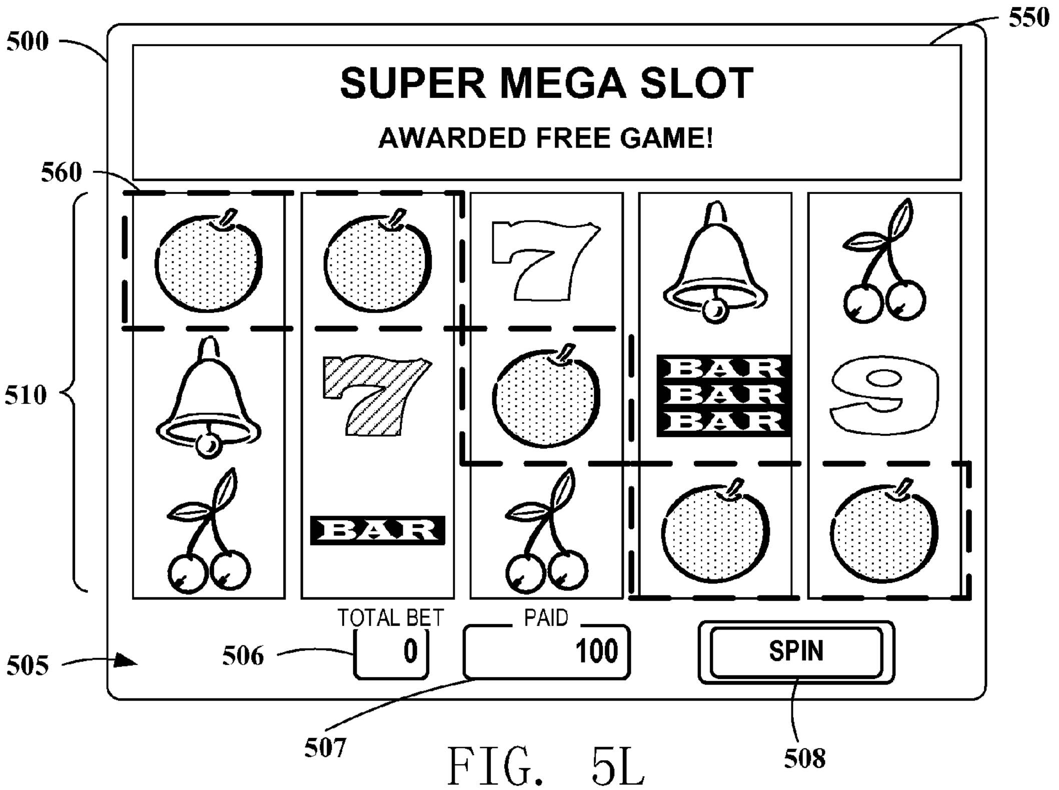

In FIG. 5L, the result of the next gaming event is shown. As shown by the Total Bet meter 506, no wager was required for this gaming event since it was a free game awarded by the mutable award in the previous gaming event (shown in FIG. 5K). In this instance, a mutable award was not provided for the free gaming event, and the messaging portion 550 shows other game information rather than a mutable award. Although no mutable award was specified for this gaming event, the player did receive a winning symbol combination 560 of five orange symbols. The 100 credit award associated with this three symbol combination is provided to the player, as indicated by the Paid meter 507.

Referring to FIGS. 6A-6H, a gaming display 600 includes a status and command portion 605, a game play grid 610, and a messaging portion 650. The status and command portion 605 may include various meters or displays, such as a Total Bet meter 606 and a Paid Meter 607, as well as interactive buttons or other controls, such as a Spin button 608. The game play grid 610 in this embodiment shows portions of five game reels used in a video slot game. In other embodiments, however, the game grid 610 may include mechanical reels, video poker hands, or other display elements to show gaming events on the display 600. The messaging portion 650 can communicate various data or information to a player at the gaming device. In these embodiments, messaging portion 650 displays information regarding mutable awards associated with gaming events on the game display 600. However, the messaging portion 650 may also be used to show a title or theme of the game, show advertisements, show game stats or information, communicate game play options or pays, or display any other type of information or data.

In the embodiment shown in FIGS. 6A-6H, the messaging portion 650 displays information about a mutable award that is provided for a following game. That is, unlike some of the embodiments illustrated above, the mutable award is specified after a game outcome is shown in a current gaming event for use on the following gaming event. Hence, in these embodiments, the player knows if and what the mutable award will be for the next game they initiate. This may build player anticipation for the next game even if a current game did not result in an award. As with some of the other examples of mutable awards discussed above, the mutable awards in this embodiment can change from game to game. In this particular embodiment, the first and second mutable components 652, 654 of the mutable award help specify a multiplier to be applied to one or more paylines in the next gaming event. Specifically, the first mutable component 652 specifies a multiplier value and the second mutable component 654 specifies one or more payline to which the multiplier is used to modify corresponding awards associated with winning symbol combinations on those paylines. Additionally, the mutable award is not necessarily provided in every gaming event in this embodiment. However, unlike some of the above illustrated embodiments, when a mutable award is not specified for a gaming event, the first and second mutable components 652, 654 display question marks rather than values.

Figure 6A:
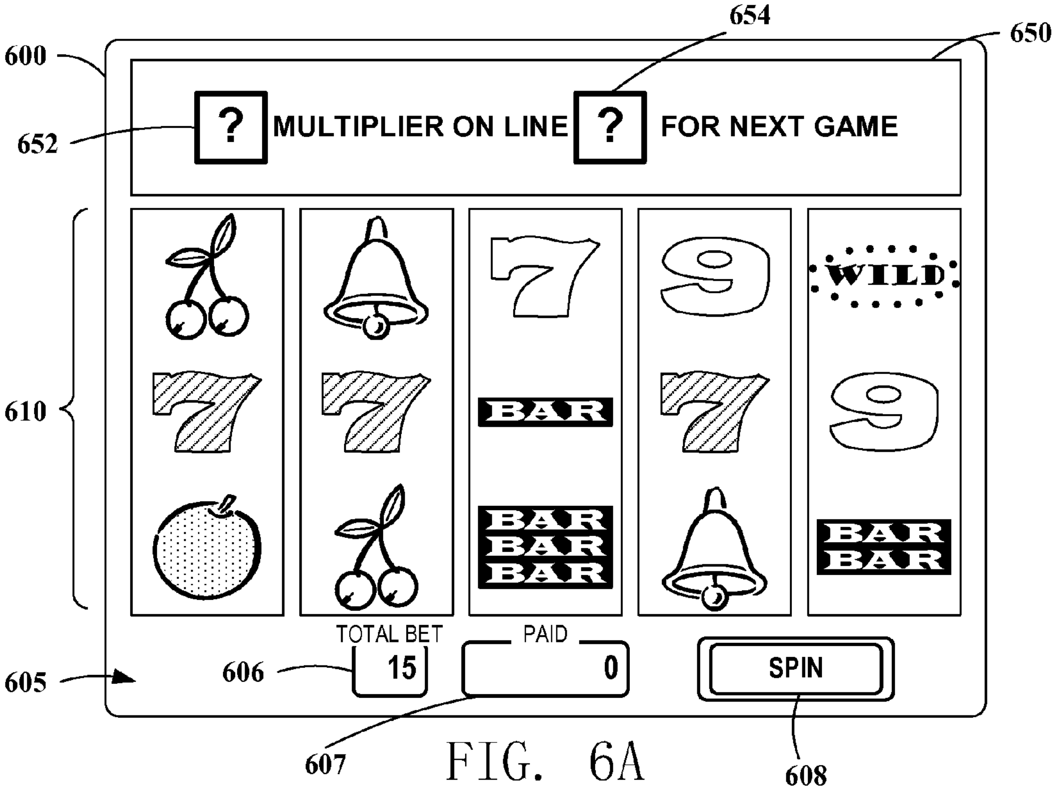
FIGS. 6A, 6B, 6C, 6D, 6E, 6F, 6G, and 6H are detail diagrams of a game display illustrating another game progression of an example gaming device having mutable awards according to embodiments of the invention.
Figure 6B:
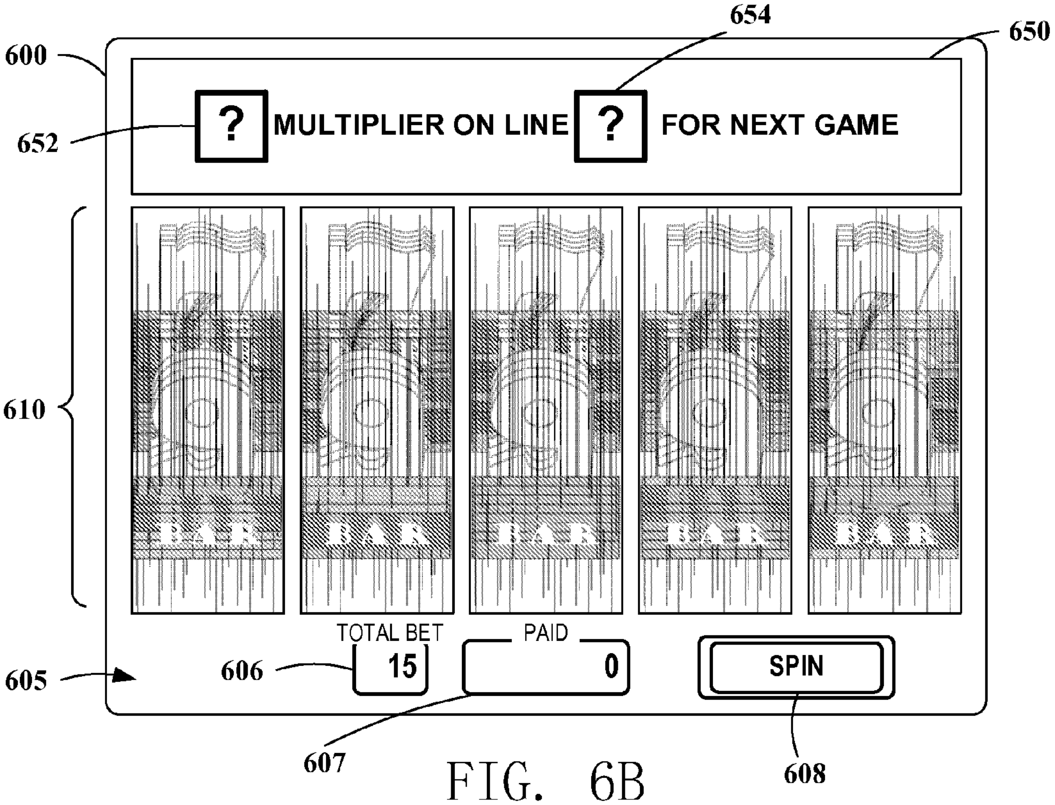
Figure 6C:
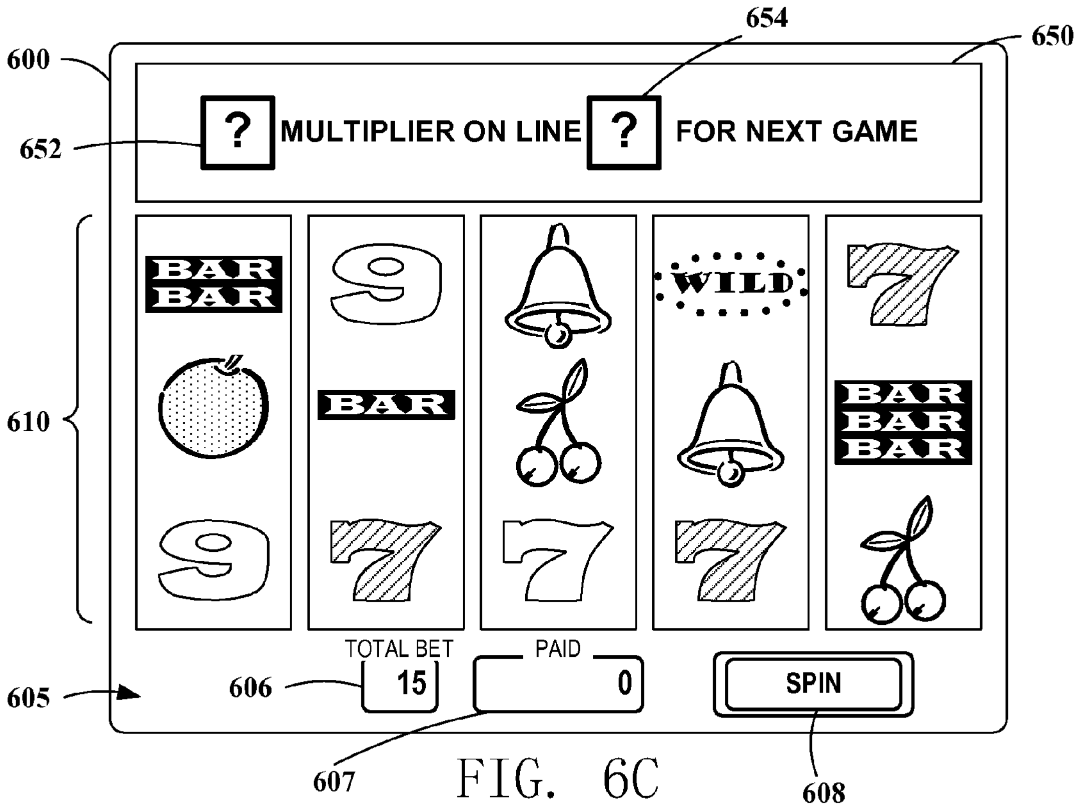
Figure 6D:
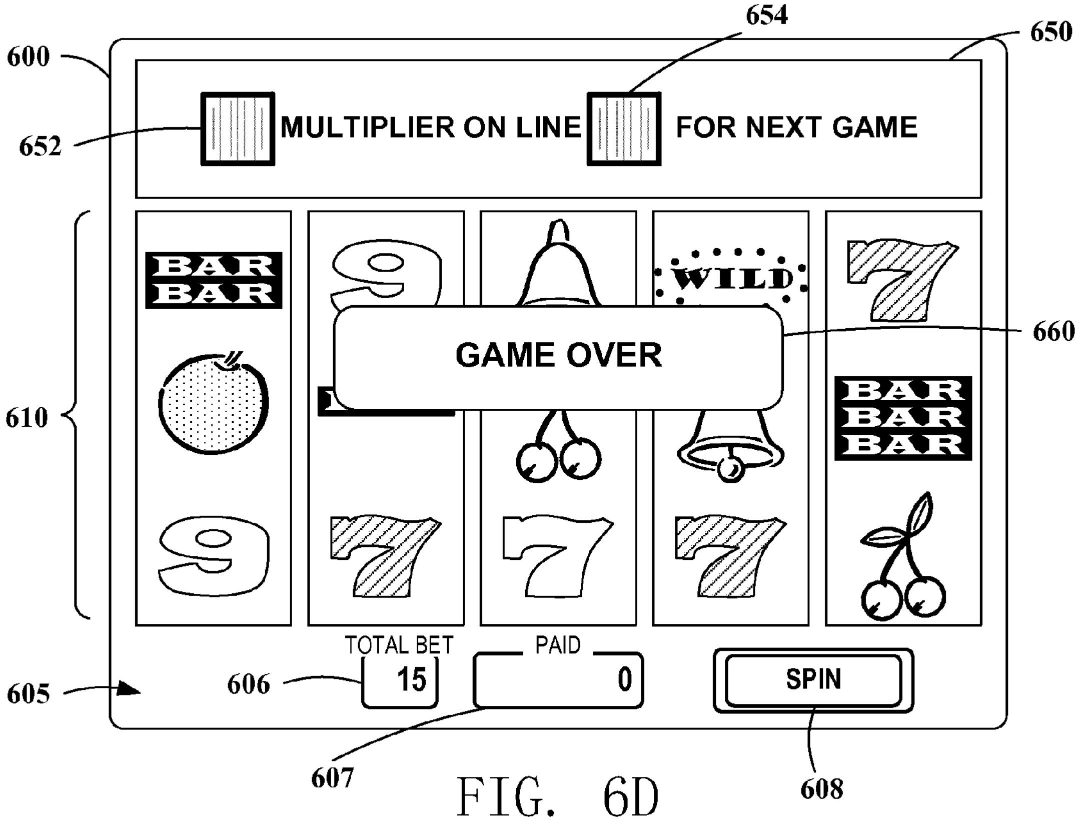

FIG. 6A shows a game display 600 between played game events where the game play grid 610 shows the outcome of the last game event, and the messaging portion 650 shows the last defined mutable award, if any, that will be applied on the next gaming event. Here, a mutable award is not specified for the next gaming event. Hence, the mutable components display question marks rather than values. FIG. 6B shows the game display 600 after initiation of a next gaming event. Here, the game reels in the game play grid 610 are spun. In FIG. 6C the reels come to rest to display a game outcome for the gaming event in the game play grid 610. As shown here, no winning symbol combinations or other awards were won in this gaming event. In FIG. 6D, a message box 660 shows that the current game is over while animation is displayed in the first and second mutable components 652, 654. In this embodiment, the animation in the first and second mutable components 652, 654 indicate that values are being determined and some form of the mutable award will be active for the following gaming event. Here, if no mutable award is specified for the following gaming event, no animation or any other visual or auditory presentation would be made in the first and second mutable components 652, 654. In other embodiments, however, animation or other visual or auditory presentations may be made regardless if values are to be specified in the first and second mutable components for the following game.

Figure 6E:
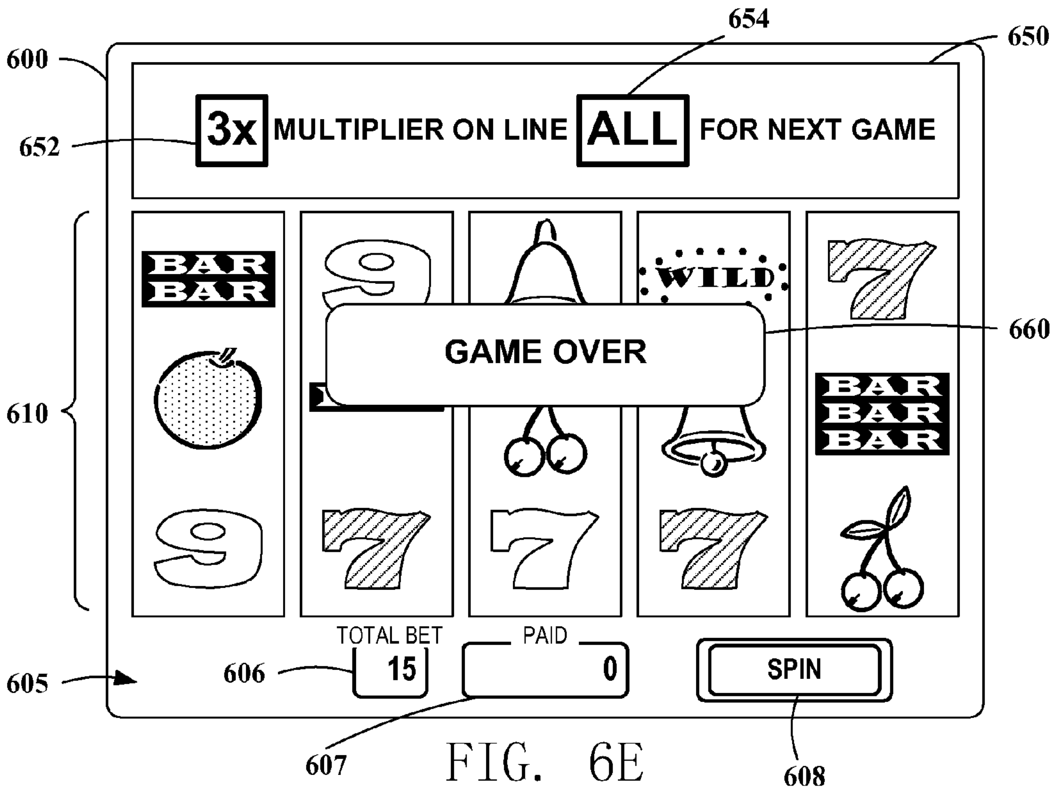

In FIG. 6E, the animation in the first and second mutable components 652, 654 ends and a multiplier value of "3×" is shown in the first mutable component while a line value of "ALL" is shown in the second mutable component. This means that a mutable award of a "3×" multiplier will be applied to award values associated with winning symbol combinations occurring on any played payline in the next gaming event. In some embodiments, this mutable award may only be used when a maximum wager and/or side wager is placed so that players cannot adjust their wager amounts to gain an advantage when a favorable mutable award is specified for the next gaming event. Additionally, in some embodiments, designated mutable awards may be used for the current gaming event as well as the next gaming event.

Figure 6F:
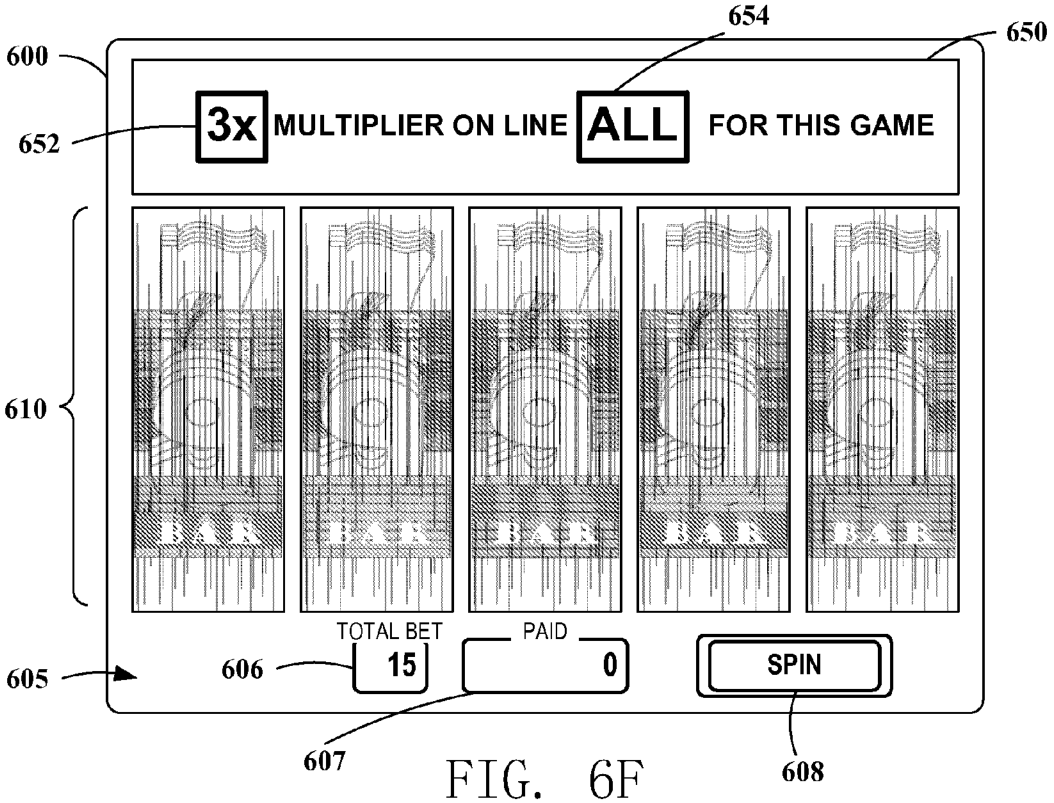
Figure 6G:
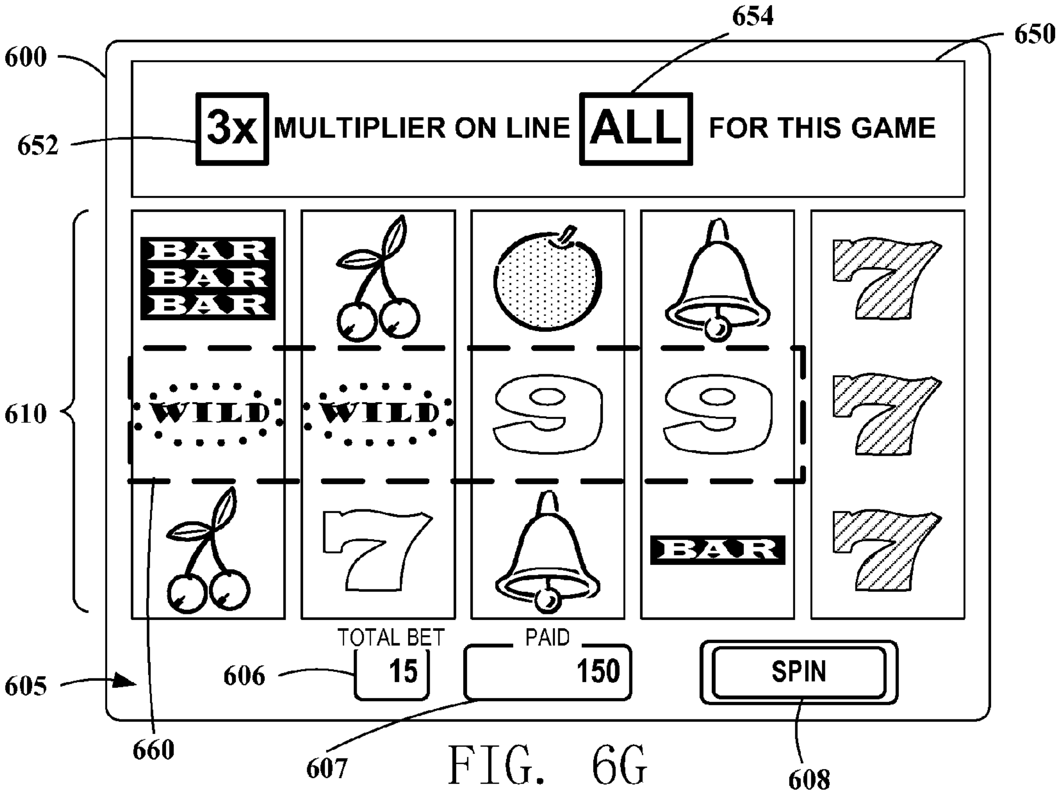
Figure 6H:
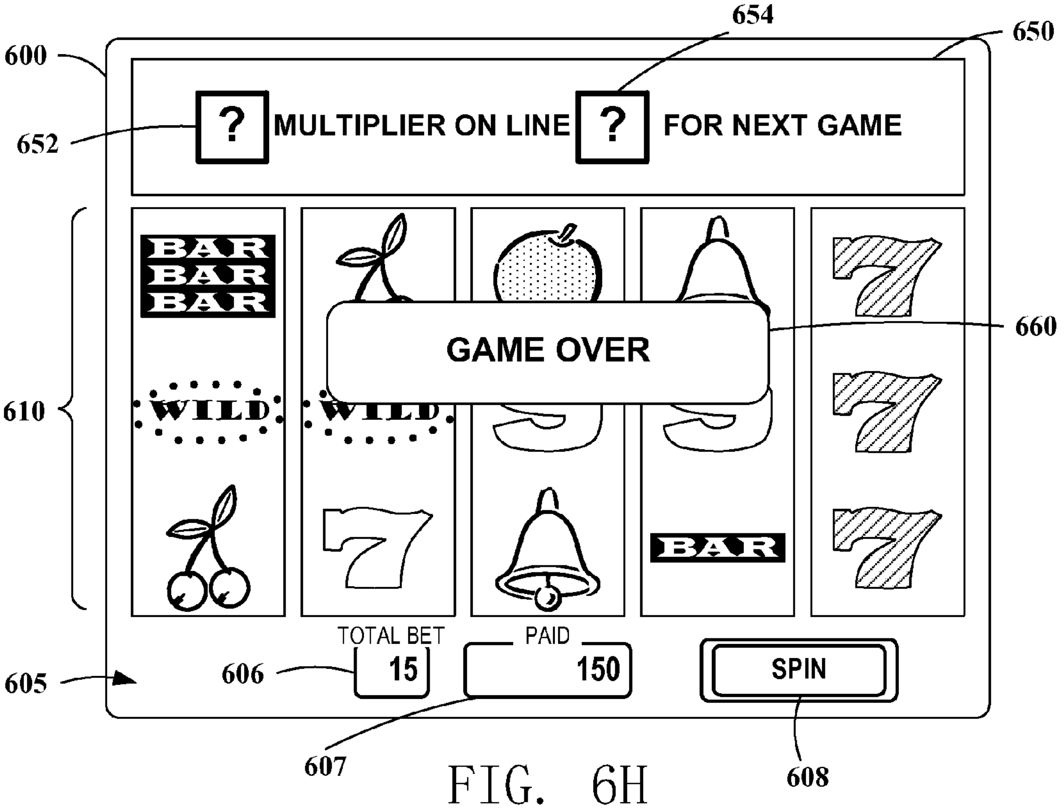

In FIG. 6F, the next gaming event has been initiated and the game reels in the game play grid 610 have been spun. The mutable award specified in the messaging portion 650 will be applied to this currently initiated gaming event. In FIG. 6G, the spinning game reels have come to a rest and a game outcome for the gaming event is displayed in the game play grid 610. As shown, a winning symbol combination 660 of four "9" symbols is received on the game play grid 610. The 50 credit award associated with this winning symbol combination 660 is then multiplied by the "3×" specified by the first mutable component 652 of the mutable award to provide the player a total award of 150 credits, as shown in the Paid meter 607. In FIG. 6H, a message box 660 shows the current game is over and a determination is made for a mutable award for the next gaming event. In this instance, it was determined that a mutable award would not be specified for the next gaming event. Hence, questions marks are displayed in the first and second mutable components 652, 654.

Figure 7:
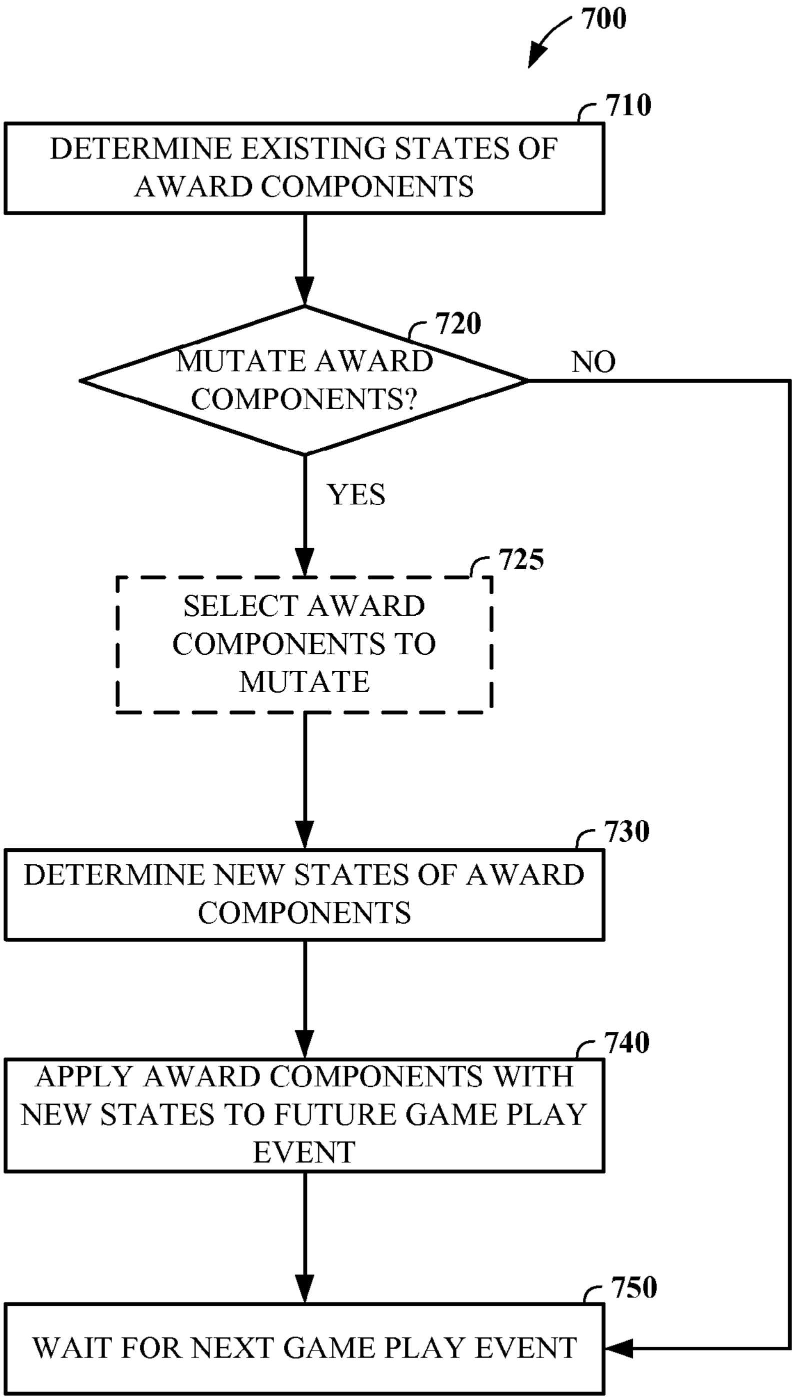
FIG. 7 is a flow diagram of an example method of providing mutable awards in gaming device according to embodiments.
Figure 8:
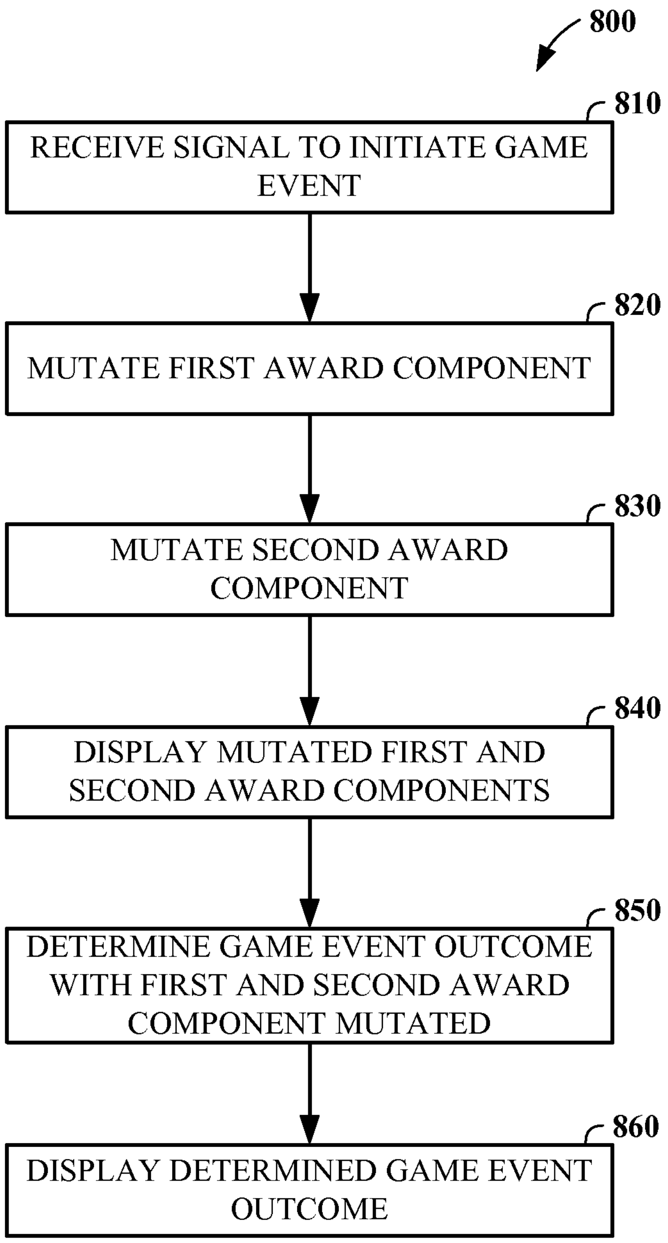
FIG. 8 is a flow diagram of another example method of providing mutable awards in gaming device according to embodiments.

FIGS. 7 and 8 are flow diagrams showing example methods of operating gaming devices to implement mutable awards according to embodiments. Although various processes are shown in a particular order in these flow diagrams, the order of these processes can be changed in other embodiments without deviating from the scope or spirit of this concept. Hence, the order of the processes shown is for illustrative purposes only and is not meant to be restrictive. Additional game processes may also be included between various processes even though they are not shown in these flow diagrams for clarity purposes. Further each of the processes may be performed by components in a single game device, such as by a game processor, or may be performed in part or whole by a remote server or processor connected to the gaming device via a network. Each process may be encoded in instructions that are stored in a memory, a computer-readable medium, or another type of storage device.

Note that these example methods are just some embodiments of how a game operation can be implemented. As discussed and shown above, many variations exist which may require additional, fewer, or different processes to complete.

Referring to FIG. 7, an example method of providing mutable awards in a gaming device begins in the flow 700 with process 710 where the existing states of award components are determined. This process 710 may be implemented by accessing a memory, registers, software code, or other storage mediums to determine an existing value, existing state, existing trigger condition, etc. for award components that variable. In process 720, it is determined if any of the award components are to be mutated. Process 720 may examine trigger conditions or other criteria in making the determination if one or more award components are to be mutated. For example, in some embodiments a trigger condition may be the placement of a wager to initiate a game or gaming event on the gaming device. In other examples, a trigger condition may be a predetermined time interval having elapsed, a specific award being won in a previous game, or any other trigger condition relating to the gaming device. If it is determined in process 720 that no award components are to be mutated, the flow 700 proceeds to process 750 to wait for a next game play event.

If it is determined in process 720 that one or more award components are to be mutated, the flow 700 proceeds to optional process 725 where an optional selection is made as to which award components are being mutated. In embodiments where all award conditions are subject to mutation when a triggering event occurs, optional process 725 may not be required. In other embodiments where one or more of multiple award components may be mutated with a given trigger condition, process 725 enables the determination of which award components are to be mutated. The selection mechanism in process 725 may include a random selection, or may make the selections based on the trigger condition, or based on one or more predefined rule.

Flow 700 then proceeds to process 730 where new states are determined for the selected award components. This determination in process 730 may include a random selection, may be based on the trigger condition, or may be based on one or more predefined rule. In process 740, the award components with new states are applied to future game play events (unless another trigger condition changes the states of one or more award components prior to the initiation of a future game play event). Flow 700 then proceeds to process 750 where the gaming device waits for initiation of the next game play event.

Referring to FIG. 8, an example method of providing mutable awards in a gaming device begins in the flow 800 with process 810 where a signal to initiate a game event is received. After the signal has been received in process 810, a first award component is mutated in process 820 and a second award component is mutated in process 830. The first and second mutated award components are then displayed in process 840. Here, for example, the first and second mutated award components may be shown on the award information portion 111 (FIG. 1) of a game display. In process 850, a game event outcome is determined using the first and second mutated award components from processes 820 and 830. This game event outcome is then displayed in process 860.

Figure 9:
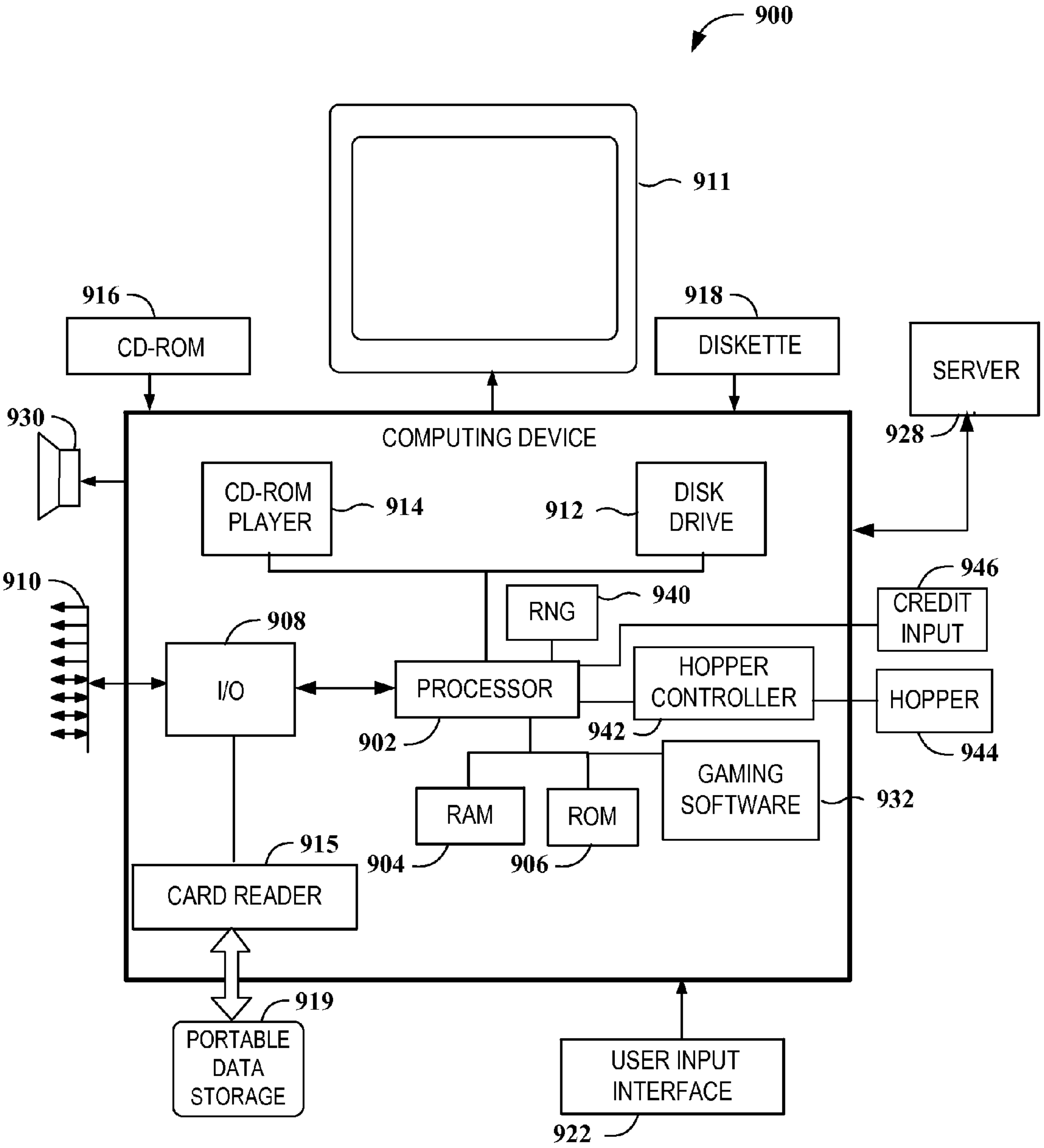
FIG. 9 is a block diagram illustrating a computing arrangement according to embodiments of the invention.

As may now be readily understood, one or more devices may be programmed to play various embodiments of the invention. The present invention may be implemented as a casino gaming machine or other special purpose gaming kiosk as described hereinabove, or may be implemented via computing systems operating under the direction of local gaming software, and/or remotely-provided software such as provided by an application service provider (ASP). The casino gaming machines utilize computing systems to control and manage the gaming activity. An example of a representative computing system capable of carrying out operations in accordance with the invention is illustrated in FIG. 9.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 900 of FIG. 9 is an example computing structure that can be used in connection with such electronic gaming machines, computers, or other computer-implemented devices to carry out operations of the present invention.

The example computing arrangement 900 suitable for performing the gaming functions in accordance with the present invention typically includes a central processor (CPU) 902 coupled to random access memory (RAM) 904 and some variation of read-only memory (ROM) 906. The ROM 906 may also represent other types of storage media to store programs, such as programmable ROM (PROM), erasable PROM (EPROM), etc. The processor 902 may communicate with other internal and external components through input/output (I/O) circuitry 908 and bussing 910, to provide control signals, communication signals, and the like.

The computing arrangement 900 may also include one or more data storage devices, including hard and floppy disk drives 912, CD-ROM drives 914, card reader 915, and other hardware capable of reading and/or storing information such as DVD, etc. In one embodiment, software for carrying out the operations in accordance with the present invention may be stored and distributed on a CD-ROM 916, diskette 918, access card 919, or other form of computer readable media capable of portably storing information. These storage media may be inserted into, and read by, devices such as the CD-ROM drive 914, the disk drive 912, card reader 915, etc. The software may also be transmitted to the computing arrangement 900 via data signals, such as being downloaded electronically via a network, such as the Internet. Further, as previously described, the software for carrying out the functions associated with the present invention may alternatively be stored in internal memory/storage of the computing device 900, such as in the ROM 906.

The computing arrangement 900 is coupled to the display 911, which represents a display on which the gaming activities in accordance with the invention are presented. The display 911 represents the "presentation" of the video information in accordance with the invention, and may be any type of known display or presentation screen, such as liquid crystal displays, plasma displays, cathode ray tubes (CRT), digital light processing (DLP) displays, liquid crystal on silicon (LCOS) displays, etc.

Where the computing device 900 represents a stand-alone or networked computer, the display 911 may represent a standard computer terminal or display capable of displaying multiple windows, frames, etc. Where the computing device is embedded within an electronic gaming machine, the display 911 corresponds to the display screen of the gaming machine/kiosk. A user input interface 922 such as a mouse, keyboard/keypad, microphone, touch pad, trackball, joystick, touch screen, voice-recognition system, etc. may be provided. The display 911 may also act as a user input device, e.g., where the display 911 is a touchscreen device.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs as known in the art may be implemented using hardware, software operable in connection with the processor 902, or some combination of hardware and software. The present invention is operable using any known RNG, and may be integrally programmed as part of the processor 902 operation, or alternatively may be a separate RNG controller 940.

The computing arrangement 900 may be connected to other computing devices or gaming machines, such as via a network. The computing arrangement 900 may be connected to a network server 928 in an intranet or local network configuration. The computer may further be part of a larger network configuration as in a global area network (GAN) such as the Internet. In such a case, the computer may have access to one or more web servers via the Internet. In other arrangements, the computing arrangement 900 may be configured as an Internet server and software for carrying out the operations in accordance with the present invention may interact with the player via one or more networks.

Other components directed to gaming machine implementations include manners of gaming participant payment, and gaming machine payout. For example, a gaming machine including the computing arrangement 900 may also include a hopper controller 942 to determine the amount of payout to be provided to the participant. The hopper controller may be integrally implemented with the processor 902, or alternatively as a separate hopper controller 942. A hopper 944 may also be provided in gaming machine embodiments, where the hopper serves as the mechanism holding the coins/tokens of the machine. The wager input module 946 represents any mechanism for accepting coins, tokens, coupons, bills, electronic fund transfer (EFT), tickets, credit cards, smart cards, membership cards, etc., for which a participant inputs a wager amount. It will be appreciated that the primary gaming software 932 may be able to control payouts via the hopper 944 and controller 942 for independently determined payout events.

Among other functions, the computing arrangement 900 provides an interactive experience to players via input interface 922 and output devices, such as the display 911, speaker 930, etc. These experiences are generally controlled by gaming software 932 that controls a primary gaming activity of the computing arrangement 900. The gaming software 932 may be temporarily loaded into RAM 904, and may be stored locally using any combination of ROM 906, drives 912, media player 914, or other computer-readable storage media known in the art. The primary gaming software 932 may also be accessed remotely, such as via the server 928 or the Internet.

The primary gaming software 932 in the computing arrangement 900 is shown here as an application software module. According to embodiments of the present invention, this software 932 provides a slot game or similar game of chance as described hereinabove. For example, the software 932 may present, by way of the display 911, representations of symbols to map or otherwise display as part of a slot based game having reels. However, in other embodiments, the principles of this concept may be applied to poker games or other types of games of chance. One or more aligned positions of these game elements may be evaluated to determine awards based on a paytable. The software 932 may include instructions to provide other functionality as known in the art and described herein, such as shown and described above regarding FIGS. 1-8.

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A gaming device comprising:
- a display including a video screen having a game play grid to display game outcomes of gaming events, and a messaging portion to display a mutable award including a first mutable component and a second mutable component;
- a player interface including at least one button, the button configured to generate a signal in response to being activated;
- a wager input device structured to identify and validate currency or currency based tickets;
- secured circuitry operable to generate random numbers; and
- game circuitry operable to:
  - receive a primary game initiation signal,
  - randomly select a value for at least one of the first mutable component and the second mutable component,
  - display the at least one selected value in the messaging portion of the display,
  - determine an outcome for a primary gaming event,
  - display the determined primary game outcome in the game play grid of the display,
  - evaluate the determined primary game outcome to identify winning symbol combinations,
  - evaluate the mutable award to identify whether an award triggering criterion has been satisfied,
  - implement the mutable award utilizing at least one of the values of the first mutable component and the second mutable component, and
  - provide awards based on the evaluation of the primary game outcome and the implementation of the mutable award.

2. The gaming device of claim 1, wherein the first mutable component of the mutable award specifies the award triggering criterion.

3. The gaming device of claim 2, wherein the award triggering criterion specified by the first mutable component includes identifying a triggering symbol chosen from a plurality of symbols used in the primary gaming event.

4. The gaming device of claim 3, wherein the award triggering criterion specified by the first mutable component includes identifying a number of triggering symbols needed to trigger the mutable award.

5. The gaming device of claim 2, wherein the award triggering criterion specified by the first mutable component includes identifying at least one triggering payline.

6. The gaming device of claim 1, wherein the first mutable component of the mutable award specifies an award type.

7. The gaming device of claim 6, wherein the specified award type for the mutable award includes at least one of a multiplier award, a free games award, a progressive award, or a bonus credit award.

8. The gaming device of claim 1, wherein the second mutable component of the mutable award specifies a degree of magnitude for the mutable award.

9. The gaming device of claim 8, wherein the specified degree of magnitude for the mutable award includes at least one of a multiplier value, a number of free games in a free games award, an indication of one of a plurality of progressive awards to be associated with the mutable award, or a bonus credit value.

10. The gaming device of claim 1, further comprising a memory to store a mutable award template, wherein the first mutable component and the second mutable component indicate values to fill in the mutable award template to generate the mutable award.

11. The gaming device of claim 1, wherein the operation of the game circuitry to select a value for at least one of the first mutable component and the second mutable component includes incrementing a value for one of the first mutable component or the second mutable component to improve odds of triggering the mutable award.

12. A gaming device comprising:
- a display including a video screen having a game play grid to display game outcomes of gaming events, and a messaging portion to display a mutable award including a first mutable component associated with an award triggering criterion and a second mutable component associated with an award magnitude;
- a player interface including at least one button, the button configured to generate a signal in response to being activated;
- a wager input device structured to identify and validate currency or currency based tickets;
- secured circuitry operable to generate random numbers; and
- game circuitry operable to:
  - receive a first game initiation signal,
  - determine an outcome for a first gaming event,
  - display the determined first game outcome in the game play grid of the display,
  - evaluate the determined first game outcome to identify winning symbol combinations,
  - provide awards based on the evaluation of the first game outcome, randomly select values for the first mutable component and the second mutable component, respectively, display the mutable award with the selected values in the messaging portion of the display, receive a second game initiation signal, determine an outcome for a second gaming event, display the determined second game outcome in the game play grid of the display, evaluate the determined second game outcome to identify winning symbol combinations, evaluate the second game outcome to determine whether the randomly selected value of the first mutable component specifying the award triggering criterion has been satisfied, implement the award magnitude specified by the randomly selected value of the second mutable component when the award triggering criterion has been satisfied, and provide awards based on the evaluation of the second game outcome and the implementation of the award magnitude specified in the second mutable component of the mutable award.

13. The gaming device of claim 12, wherein the award triggering criterion specified by the first mutable component includes identifying a triggering symbol chosen from a plurality of symbols used in the primary gaming event.

14. The gaming device of claim 13, wherein the award triggering criterion specified by the first mutable component includes identifying a number of triggering symbols needed to trigger the mutable award.

15. The gaming device of claim 12, wherein the specified degree of magnitude for the mutable award includes at least one of a multiplier value, a number of free games in a free games award, an indication of one of a plurality of progressive awards to be associated with the mutable award, or a bonus credit value.

16. A gaming system connected to a game display operable to display a game play grid to display game outcomes of gaming events and a messaging portion to display a mutable award, and connected to a player interface operable to receive player inputs, the gaming system including circuitry operable to perform processes comprising:

receiving a primary game initiation signal;

selecting an award triggering criterion from a plurality of predefined award triggers for the mutable award;

transmitting a signal to the game display to display the award triggering criterion for the mutable award in the messaging portion of the game display;

determining an outcome for the primary gaming event;

transmitting a signal to the game display to display the determined primary game outcome in the game play grid of the game display;

evaluating the determined primary game outcome to identify winning symbol combinations;

evaluating the mutable award to identify whether the selected award triggering criterion has been satisfied;

implementing the mutable award; and providing awards based on the evaluation of the primary game outcome and the implementation of the mutable award.

17. The gaming system of claim 16, wherein the circuitry is further operable to perform the process of selecting an award type from a plurality of predefined award types for the mutable award.

18. The gaming system of claim 16, wherein the operation of the circuitry to perform the process of selecting an award triggering criterion from a plurality of predefined award triggers for the mutable award further includes determining if a mutable award will be active for the primary gaming event.

19. The gaming system of claim 16, wherein each of the plurality of predefined award triggers includes an award type associated with the respective award trigger.

20. The gaming system of claim 16, wherein each of the plurality of predefined award triggers includes a variable mutable component, the circuitry being further operable to perform the process of selecting an award type from a plurality of predefined award types for the mutable component of the selected award triggering criterion.

* * * * *